United States Patent
Jung et al.

(10) Patent No.: US 9,973,902 B2
(45) Date of Patent: *May 15, 2018

(54) METHOD FOR REPORTING MBMS INFORMATION IN WIRELESS COMMUNICATION SYSTEM AND DEVICE FOR SUPPORTING SAME

(71) Applicant: LG ELECTRONICS INC., Seoul (KR)

(72) Inventors: Sunghoon Jung, Seoul (KR); Youngdae Lee, Seoul (KR); Sangwon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 170 days.

This patent is subject to a terminal disclaimer.

(21) Appl. No.: 14/766,424

(22) PCT Filed: Feb. 14, 2014

(86) PCT No.: PCT/KR2014/001243
§ 371 (c)(1),
(2) Date: Aug. 6, 2015

(87) PCT Pub. No.: WO2014/126424
PCT Pub. Date: Aug. 21, 2014

(65) Prior Publication Data
US 2015/0373506 A1  Dec. 24, 2015

Related U.S. Application Data

(60) Provisional application No. 61/765,006, filed on Feb. 14, 2013.

(51) Int. Cl.
*H04H 20/71* (2008.01)
*H04W 4/06* (2009.01)
(Continued)

(52) U.S. Cl.
CPC ............. *H04W 4/06* (2013.01); *H04L 12/189* (2013.01); *H04L 47/12* (2013.01); *H04W 24/02* (2013.01);
(Continued)

(58) Field of Classification Search
None
See application file for complete search history.

(56) References Cited

U.S. PATENT DOCUMENTS

| | | |
|---|---|---|
| 7,958,542 B2 | 6/2011 | Herrmann |
| 2004/0157603 A1 | 8/2004 | Hurtta et al. |

(Continued)

FOREIGN PATENT DOCUMENTS

| | | |
|---|---|---|
| CN | 101479997 | 7/2009 |
| CN | 101552950 | 10/2009 |

(Continued)

OTHER PUBLICATIONS

Samsung, "On the reporting the failed RRC connection establishment," 3GPP TSG RAN WG2 #77bis, R2-121272, Mar. 2012, 5 pages.

(Continued)

*Primary Examiner* — Rebecca E Song
(74) *Attorney, Agent, or Firm* — Lee Hong Degerman Kang Waimey

(57) ABSTRACT

Provided is a method for reporting multimedia broadcast and multicast service (MBMS) information by a terminal in a wireless communication system. The method comprises: determining whether or not to permit the logging of MBMS information; logging the MBMS information if the logging of the MBMS information is permitted; and reporting the logged MBMS information to a network. Whether or not to permit the logging of the MBMS information is determined on the basis of logging scope.

16 Claims, 20 Drawing Sheets

(51) Int. Cl.
*H04L 12/18* (2006.01)
*H04W 24/02* (2009.01)
*H04W 72/00* (2009.01)
*H04L 12/801* (2013.01)
*H04W 24/08* (2009.01)
*H04W 88/02* (2009.01)
*H04W 36/00* (2009.01)

(52) U.S. Cl.
CPC ......... *H04W 24/08* (2013.01); *H04W 72/005* (2013.01); *H04W 36/0055* (2013.01); *H04W 36/0083* (2013.01); *H04W 88/02* (2013.01)

(56) References Cited

U.S. PATENT DOCUMENTS

| | | | |
|---|---|---|---|
| 2005/0042987 | A1 | 2/2005 | Lee et al. |
| 2006/0291410 | A1 | 12/2006 | Herrmann |
| 2008/0267109 | A1 | 10/2008 | Wang et al. |
| 2009/0245155 | A1 | 10/2009 | Fukunaga et al. |
| 2010/0188969 | A1 | 7/2010 | Kim et al. |
| 2010/0330921 | A1 | 12/2010 | Kim et al. |
| 2012/0294220 | A1 | 11/2012 | Gou |
| 2013/0010624 | A1 | 1/2013 | He et al. |
| 2013/0070632 | A1 | 3/2013 | Jung et al. |
| 2013/0095838 | A1 | 4/2013 | Uemura et al. |
| 2013/0128756 | A1* | 5/2013 | Zhang ............... H04W 4/06 370/252 |
| 2013/0301509 | A1 | 11/2013 | Pumadi et al. |
| 2014/0153476 | A1 | 6/2014 | Wang et al. |
| 2014/0161020 | A1 | 6/2014 | Jung et al. |
| 2014/0169255 | A1* | 6/2014 | Zhang ............... H04W 72/005 370/312 |

FOREIGN PATENT DOCUMENTS

| | | |
|---|---|---|
| CN | 101675634 | 3/2010 |
| CN | 101772222 | 7/2010 |
| CN | 101835096 | 9/2010 |
| CN | 102215455 | 10/2011 |
| CN | 102804850 | 11/2012 |
| EP | 2528270 | 11/2012 |
| JP | 2009246526 A | 10/2009 |
| KR | 10-2010-0088085 | 8/2010 |
| KR | 10-2010-0138775 | 12/2010 |
| RU | 2361373 | 7/2009 |
| WO | 2008052383 A1 | 5/2008 |
| WO | 2011096692 | 8/2011 |
| WO | 2012/148203 | 11/2012 |
| WO | 2012148202 | 11/2012 |
| WO | 2013074751 A1 | 5/2013 |

OTHER PUBLICATIONS

PCT International Application No. PCT/KR2014/001243, Written Opinion of the International Searching Authority dated May 27, 2014, 1 page.

Qualcomm Inc., "Physical Layer Measurements for eMBMS", 3GPP TSG RAN #54, RP-111725, Dec. 7, 2011, 3 pages.

3rd Generation Partnership Project, "Technical Specification Group Radio Access Network; Evolved Universal Terrestrial Radio Access (E-UTRA); Radio Resource Control (RRC); Protocol specification (Release 11)", 3GPP TS 36.331 V11.2.0, Dec. 2012, 340 pages.

Qualcomm Incorporated, "MBSFN Measurement for MDT", 3GPP TSG-RAN WG2#85, R2-140103, Jan. 31, 2014, 5 pages.

MediaTek, "Multi-PLMN support", 3GPP TSG-RAN2 Meeting #78, R2-122812, May 15, 2012, 37 pages.

Nsn et al., "Higher layer issues with MBSFN MDT measurements", 3GPP TSG-RAN WG2 Meeting #85, R2-140378, Jan. 31, 2014, 6 pages.

Alcatel-Lucent Shanghai Bell et al. "Service Information Exchange for MBMS Service Continuity", 3GPP TSG-RAN WG3 Meeting #73, R3-112116, Sep. 9, 2011, 3 pages.

European Patent Office Application No. 14752166.0, Search Report dated Sep. 16, 2016, 9 pages.

European Patent Office Application No. 14752065.4, Search Report dated Sep. 16, 2016, 8 pages.

European Patent Office Application No. 14751270.1, Search Report dated Sep. 16, 2016, 7 pages.

U.S. Appl. No. 14/767,851, Office Action dated Jan. 3, 2017, 17 pages.

Russian Federation Federal Service for Intellectual Property, Patents and Trademarks Application Serial No. 2015138737/07, Office Action dated Dec. 13, 2016, 14 pages.

United States Patent and Trademark Office U.S. Appl. No. 14/767,844, Office Action dated Feb. 26, 2018, 16 pages.

* cited by examiner

METHOD FOR REPORTING MBMS INFORMATION IN WIRELESS COMMUNICATION SYSTEM AND DEVICE FOR SUPPORTING SAME

CROSS-REFERENCE TO RELATED APPLICATIONS

This application is the National Stage filing under 35 U.S.C. 371 of International Application No. PCT/KR2014/001243, filed on Feb. 14, 2014, which claims the benefit of U.S. Provisional Application No. 61/765,006, filed on Feb. 14, 2013, the contents of which are all hereby incorporated by reference herein in their entirety.

BACKGROUND OF THE INVENTION

Field of the Invention

The present invention relates to wireless communication and, more particularly, to a method for reporting Multimedia Broadcast and Multicast Service (MBMS) information in a wireless communication system and a device supporting the same.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

As technologies for supporting wireless communication are advanced, the type of service that may be provided from a network to users is diversified. A Multimedia Broadcast and Multicast Service (MBMS) is one of those services, and provides a terminal with information that may be provided in TV, movie, and digital forms in a broadcast and/or multicast manner. The MBMS has a great advantage in excellent efficiency compared to the case where a network is newly constructed in order to provide a service in that it can provide a service through the infrastructure of an already constructed network.

In order to optimize network performance, a network obtains a measured result from a terminal. In this case, the network may also obtain location information related to the measured result from the terminal and optimize network performance more efficiently. In order to optimize networks, service providers may obtain a measured result and location information using a terminal, which is called a Minimization of Driving Test (MDT).

In order to optimize network performance in relation to the MBMS, a network may support an MBMS MDT. The MBMS MDT may include a series of procedures, such as a configuration, acquisition, and reporting for MBMS information reporting. To this end, the network may select a terminal for the MBMS information reporting based on the capabilities of a terminal and/or the consent of a terminal user. However, an MBMS service is provided on an MBMS Single Frequency Network (MBSFN) area through broadcast or multicast, and a terminal that receives the MBMS service does not provide corresponding feedback. Accordingly, a network rarely obtains information about the MBMS reception status of the terminal. Accordingly, there is a need for a method that enables a network to receive a report on MBMS information from a terminal.

SUMMARY OF THE INVENTION

An object of the present invention is to provide a method for reporting Multimedia Broadcast and Multicast Service (MBMS) information in a wireless communication system and a device supporting the same.

In one aspect, provided is a method of reporting, by user equipment, Multimedia Broadcast and Multicast Service (MBMS) information in a wireless communication system. The method includes determining whether a logging of MBMS information is permitted, logging the MBMS information if the logging of the MBMS information is permitted and reporting the logged MBMS information to a network. Whether the logging of the MBMS information is permitted is determined based on a logging scope.

The logging scope may comprise one or more MBMS Single Frequency Network (MBSFN) area identity lists in which the logging of the MBMS information by the user equipment is permitted.

Determining whether the logging of the MBMS information is permitted may comprise determining that the logging of the MBMS information is permitted if an MBSFN identity related to an MBMS service provided by a cell being camped on by the user equipment is included in the MBSFN area identity list of the logging scope.

The logging scope may comprise an MBMS Service Area Identity (SAI) list of one or more MBMS service areas in which the logging of the MBMS information by the user equipment is permitted.

Determining whether the logging of the MBMS information is permitted may comprise determining that the logging of the MBMS information is permitted if an MBMS SAI related to an MBMS service provided by a cell being camped on by the user equipment is included in the MBMS SAI list of the logging scope.

The logging scope may be indicative of a specific Physical Multicast Channel (PMCH) in which the logging of the MBMS information by the user equipment is permitted.

Determining whether the logging of the MBMS information is permitted may comprise determining that the logging of the MBMS information is permitted if MBMS control information and an MBMS service provided by a cell being camped on by the user equipment is provided through the PMCH indicated by the logging scope.

The logging scope may be indicative of a specific Multicast Traffic Channel (MTCH) in which the logging of the MBMS information by the user equipment is permitted.

Determining whether the logging of the MBMS information is permitted may comprise determining that the logging of the MBMS information is permitted if an MBMS service provided by a cell being camped on by the user equipment is provided through the MTCH indicated by the logging scope.

The logging scope may be indicative of a Public Land Mobile Network (PLMN) in which the logging of the MBMS information by the user equipment is permitted.

Determining whether the logging of the MBMS information is permitted may comprise determining that the logging of the MBMS information is permitted if a PLMN of a cell being camped on by the user equipment corresponds to a PLMN according to the logging scope.

The PLMN indicated by the logging scope may be a Registered PLMN (RPLMN) of the user equipment.

The PLMN indicated by the logging scope may be a PLMN other than the Registered PLMN (RPLMN) of the user equipment.

The method may further comprise receiving an MBMS reporting configuration from the network.

The MBMS reporting configuration may comprise the logging scope.

Logging the MBMS information may comprise performing MBMS measurements on a frequency and a subframe in which an MBMS service is received and obtaining the MBMS information.

The MBMS information may comprise at least one of: MBMS control information related to the MBMS service, information about an MBMS cell providing the MBMS service, information about reception quality of the MBMS service, information about a transmission of the MBMS service, information about a location of the user equipment when the MBMS measurements are performed and wireless measurement information about the network.

Reporting the logged MBMS information to the network may comprise immediately reporting the logged MBMS information to the network in response to the logging of the MBMS information.

Reporting the logged MBMS information to the network may comprise sending a logged MBMS information availability indicator indicating that the logged MBMS information to be reported to the network is present to the network, receiving a logged MBMS information report request that requests the reporting of the logged MBMS information from the network and sending a logged MBMS information report comprising the logged MBMS information to the network in response to the logged MBMS information report request.

In another aspect, provided is a wireless device operating in a wireless communication system. The wireless device includes a Radio Frequency (RF) unit which sends and receives radio signals and a processor which is functionally coupled to the RF unit and operates. The processor is configured to: determine whether a logging of MBMS information is permitted, log the MBMS information if the logging of the MBMS information is permitted and report the logged MBMS information to a network. Whether the logging of the MBMS information is permitted is determined based on a logging scope.

In accordance with the method of reporting MBMS information according to an embodiment of the present invention, a network can set an MBMS information acquisition/logging scope for the report of MBMS information in UE so that the UE can log MBMS information and report the logged MBMS information only when the logging scope is satisfied. Accordingly, the measurements of an MBMS service and the reporting of MBMS information by UE can be controlled. This enables control of power consumed for the reporting of MBMS information by UE and enables control of signaling for the reporting of MBMS information. As a result, efficient power management and efficient management of radio resources for UE can be possible.

DESCRIPTION OF EXEMPLARY EMBODIMENTS

Figure 1:
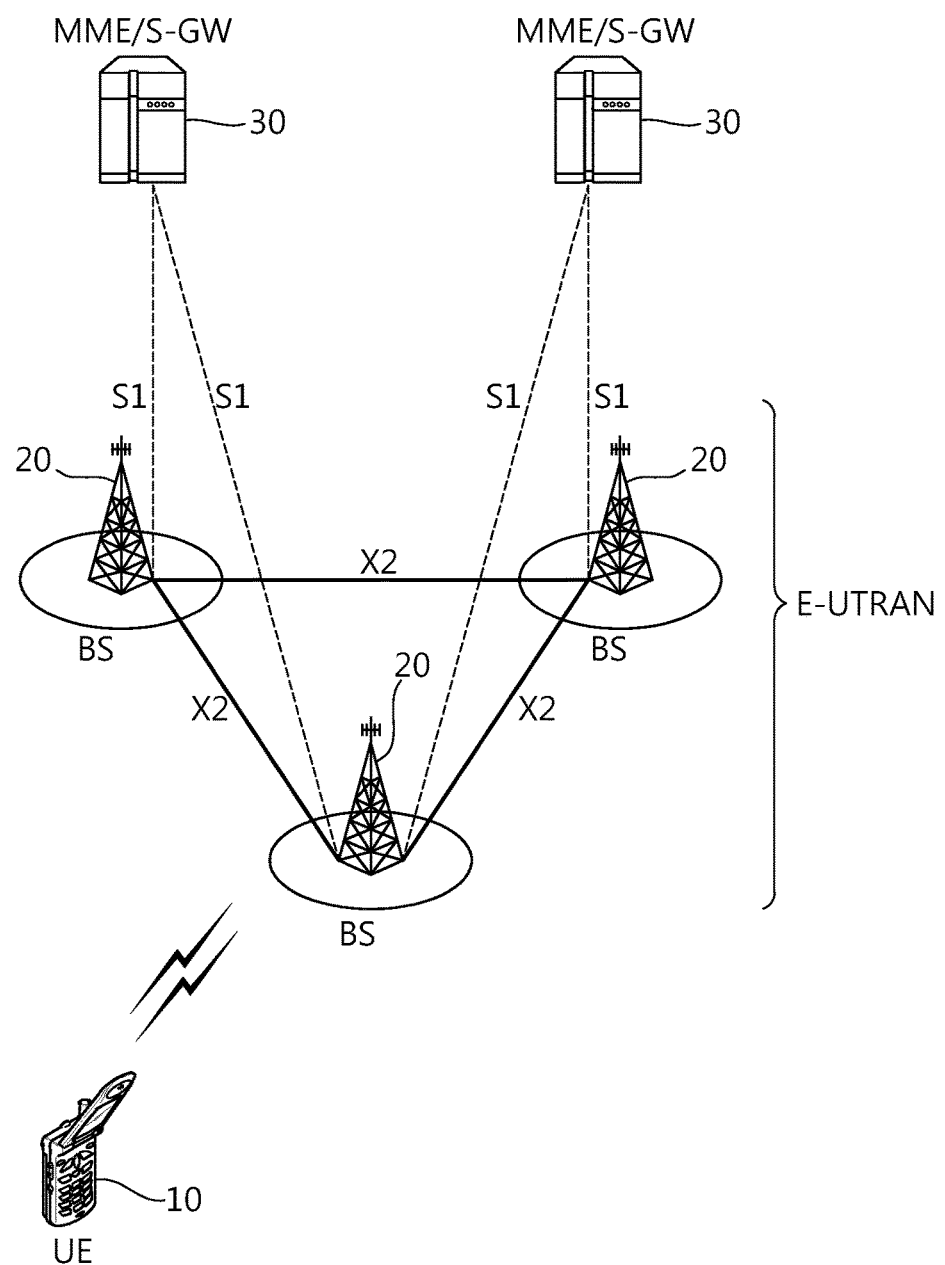
FIG. 1 illustrates a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
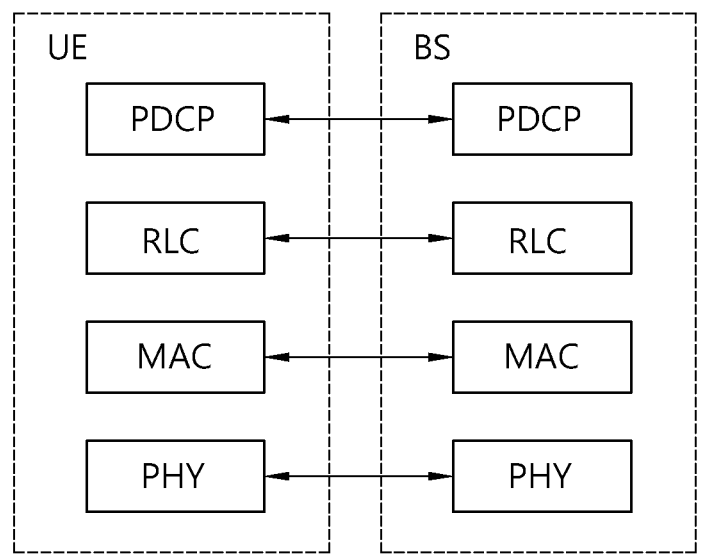
FIG. 2 is a block diagram showing the structure of a wireless protocol on the user plane.
Figure 3:
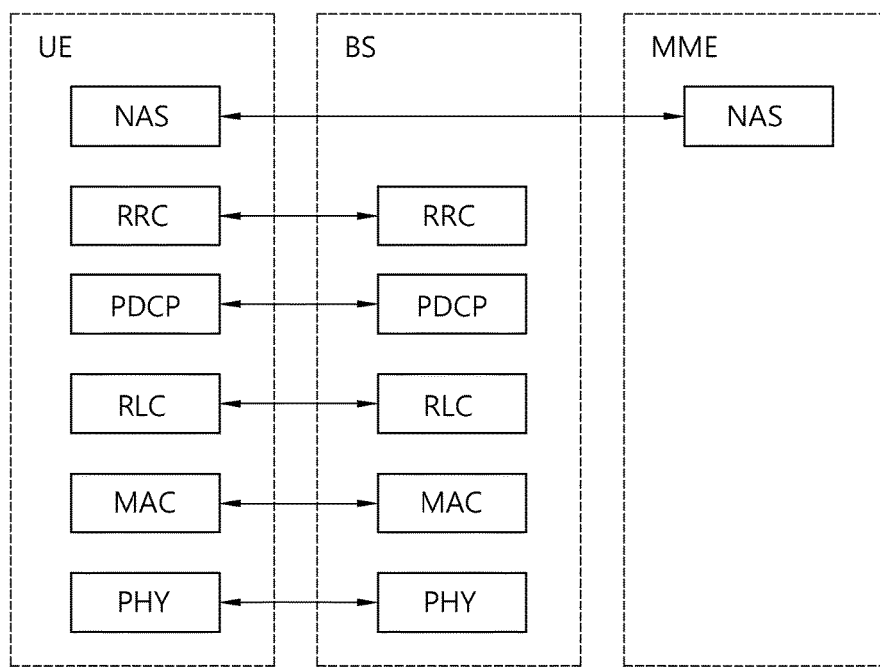
FIG. 3 is a block diagram showing the structure of a wireless protocol on the control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

As disclosed in 3GPP TS 36.211 V8.7.0, a physical channel in a 3GPP LTE may be divided into a PDSCH (Physical Downlink Shared Channel) and a PUSCH (Physical Uplink Shared Channel) being a data channel and a PDCCH (Physical Downlink Control Channel), a PCFICH (Physical Control Format Indicator Channel), a PHICH (Physical Hybrid-ARQ Indicator Channel), and a PUCCH (Physical Uplink Control Channel) being a control channel.

A PCFICH transmitted through a first OFDM symbol of a sub-frame carries a CFI (control format indicator) with respect to the number of OFDM symbols used to transmit control channels in a sub-frame. The terminal firstly receives a CFI on a PCFICH to monitor the PDCCH.

The PDCCH refers to a scheduling channel to carry schedule information as a downlink control channel. The control information transmitted through the PDCCH refers to downlink control information (DCI). The DCI may include resource allocation of the PDSCH (refers to DL grant (downlink grant)), resource allocation of the PUSCH (refers to uplink (UL) grant)), and a group and/or VoIP (Voice over Internet Protocol) of a transmission power control command with respect to individual UEs in an optional UE group.

In the 3GPP LTE, blind decoding is used to detect the PDCCH. The blind decoding de-masks a desired identifier to a CRC (Cyclic Redundancy Check) of a received PDCCH (refers to candidate PDCCH), and checks a CRC error to determine whether a corresponding PDCCH is a control channel thereof.

The base station determines a PDCCH format according to a DCI to be sent to the terminal to attach a CRC to the DCI, and masks a unique identifier (refers to RNTI (Radio Network Temporary Identifier)) according to an owner or a use of the PDCCH.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a MIB (Master Information Block) and a plurality of SIBs (System Information Blocks).

The MIB may include a limited number of parameters which are most frequently transmitted and are required for acquisition for other information from a cell. The terminal firstly searches the MIB after downlink synchronization. The MIB may include information such as a downlink channel bandwidth, PHICH configuration, an SFN to support synchronization and to be operated as a timing reference, and eNB transmission antenna configuration. The MIB may be broadcasted on the BCH.

A SIB1 (SystemInformationBlockType1) among SIBs is transmitted while being included in a "SystemInformationBlockType1", and other SIBs except for the SIB1 is transmitted while being included in the system information message. The SIBs may be flexibly mapped to the system information message according to a scheduling information list parameter included in the SIB1. However, each SIB is included in a single system information message, and only SIBs having the same scheduling required value (e.g. period) may be mapped to the same system information message. Further, a SIB2 (SystemInformationBlockType2) is mapped to a system information message corresponding to a first entry in a system information message list of a scheduling information list. A plurality of system information messages may be transmitted within the same time period. The SIB1 and all system information messages are transmitted on a DL-SCH.

Further to broadcast transmission, the E-UTRAN may be dedicated-signaled in a state that the SIB1 includes the same parameter as a preconfiguration value. In this case, the SIB1 may be transmitted while being included in a RRC connection reconfiguration message.

The SIB1 includes information on terminal cell access, and defines scheduling of other SIBs. The SIB1 may include PLMN identifiers of a network, a TAC (Tracking Area Code), a cell ID, a cell barring status to indicate whether a cell may camp-on, the lowest reception level required in a cell used as a cell reselection reference, and information on a transmission time and a time period of other SIBs.

The SIB2 may include radio resource configuration information common in all terminals. The SIB2 may include a uplink carrier frequency, an uplink channel bandwidth, RACH configuration, paging configuration, uplink power control configuration, sounding reference signal configuration, ACK/NACK 전송을 지원하는 PUCCH configuration and PUSCH configuration supporting ACK/NACK transmission.

The terminal may apply acquisition and change sensing procedures of system information with respect to only a PCell. In the SCell, the E-UTRAN may provide all system information on the RRC connection state operation through dedicated signaling when a corresponding SCell is added. When system information on the configured SCell is changed, the E-UTRAN may release a considered SCell and may add the considered SCell later, which may be performed together with a single RRC connection reconfiguration message. The E-UTRAN may configure parameter values different from a value broadcasted in the considered SCell through the dedicated signaling.

The terminal should ensure validity with respect to system information of a specific type. The above system information refers to required system information. The required system information may be defined as follows.

When the terminal is in a RRC idle state: the terminal should to have a valid version of an MIB and the SIB1 as well as a SIB2 to a SIB8, which may depend on support of a considered RAT.

When the terminal is in a RRC connection state: the terminal should ensure to have valid versions of the MIB, the SIB1 and the SIB2.

In general, after the system information is acquired, validity may be ensured with a maximum three hours.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
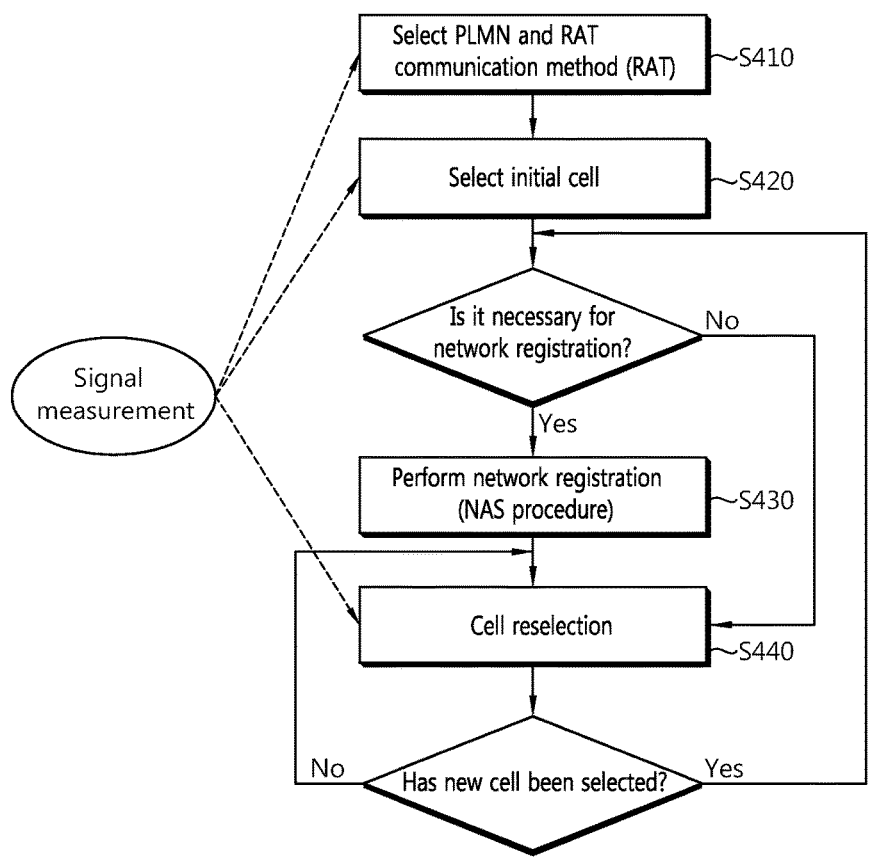
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
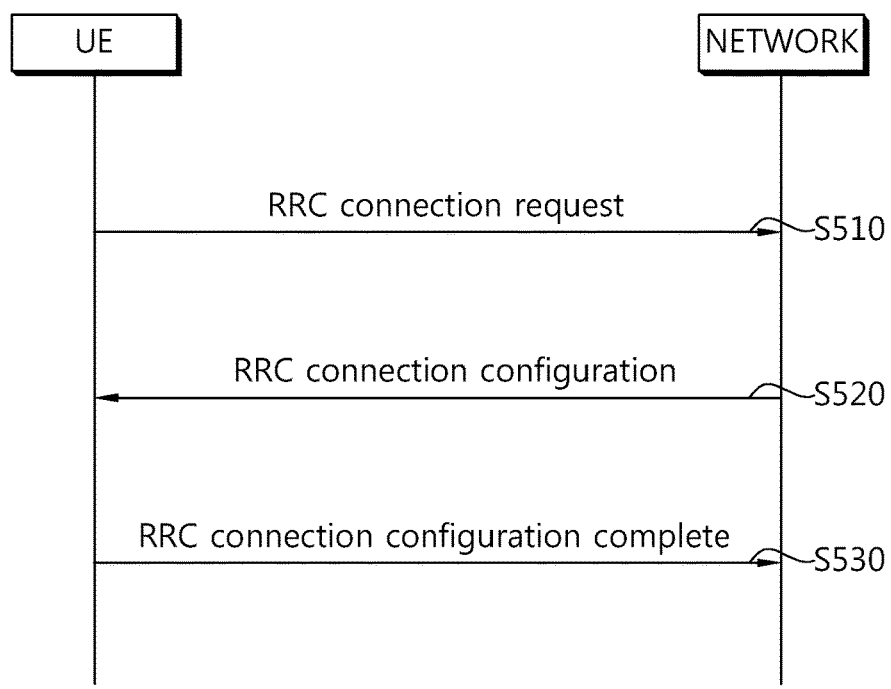
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
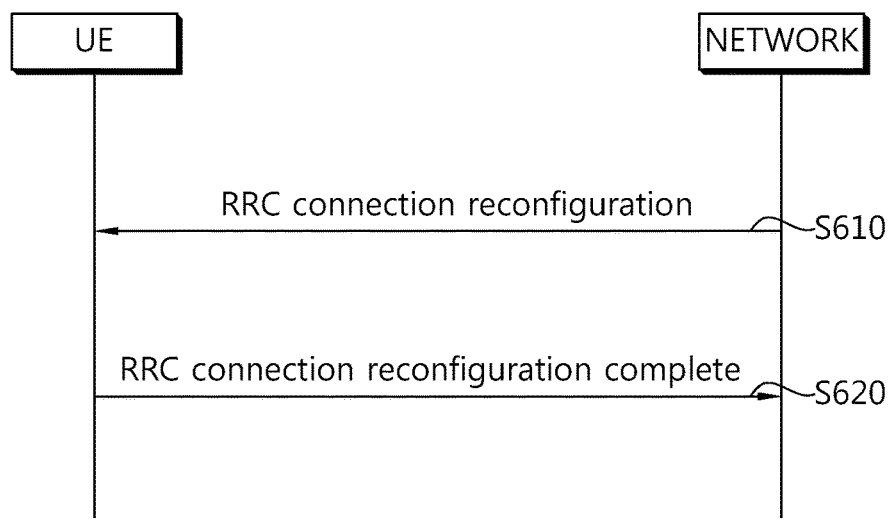
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

A cell selection reference may be defined as expressed by a following equation 1.

$$\text{Srxlev} > 0 \text{ AND Squal} > 0 \qquad \text{[Equation 1]}$$

where:

$\text{Srxlev} = Q_{rxlevmeas} - (Q_{rxlevmin} + Q_{rxlevminoffset}) - \text{Pcompensation}$ $\text{Squal} = Q_{qualmeas} - (Q_{qualmin} + Q_{qualminoffset})$ In this case, respective variables of the equation 1 may be defined by a following table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN [5] |
| $Q_{qualminoffset}$ | Offset to the signalled $Q_{qualmin}$ taken into account in the Squal evaluation as a result of a periodic search for a higher priority PLMN while camped normally in a VPLMN [5] |
| Pcompensation | max($P_{EMAX}$ - $P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signaled values Qrxlevminoffset and Qqualminoffset are a result of periodic search with respect to a PLMN of a higher priority while the terminal camps on a normal cell in the VPLMN. During the periodic search with the PLMN having the higher priority, the terminal may perform cell selection estimation using stored parameters from other cell of the PLMN having the higher priority.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_s = Q_{meas,s} + Q_{hyst}, R_n = Q_{meas,s} - Q_{offset}$$ [Equation 1]

In this case, $R_s$ is the ranking criterion of a serving cell, $R_n$ is the ranking criterion of a neighbor cell, $Q_{meas,s}$ is the quality value of the serving cell measured by UE, $Q_{meas,n}$ is the quality value of the neighbor cell measured by UE, $Q_{hyst}$ is the hysteresis value for ranking, and $Q_{offset}$ is an offset between the two cells.

In Intra-frequency, if UE receives an offset "$Q_{offsets,n}$" between a serving cell and a neighbor cell, $Q_{offset} = Q_{offsets,n}$. If UE does not receive $Q_{offsets,n}$, $Q_{offset} = 0$.

In Inter-frequency, if UE receives an offset "$Q_{offsets,n}$" for a corresponding cell, $Q_{offset} = Q_{offsets,n} + Q_{frequency}$. If UE does not receive "$Q_{offsets,n}$", $Q_{offset} = Q_{frequency}$.

If the ranking criterion $R_s$ of a serving cell and the ranking criterion $R_n$ of a neighbor cell are changed in a similar state, ranking priority is frequency changed as a result of the change, and UE may alternately reselect the twos. $Q_{hyst}$ is a parameter that gives hysteresis to cell reselection so that UE is prevented from to alternately reselecting two cells.

UE measures $R_s$ of a serving cell and $R_n$ of a neighbor cell according to the above equation, considers a cell having the greatest ranking criterion value to be the highest-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

In order to perform the cell reselection according to the cell reselection estimation, when the cell reselection reference is satisfied for a specific time, the terminal determines that the cell reselection reference is satisfied and may perform cell movement to a selected target cell. In this case, the specific time may be given from the network as a Treselection parameter. The Treselection may specify a cell reselection timer value, and may be defined with respect to each frequency of the E-UTRAN and other RAT.

Hereinafter, cell reselection information used for cell reselection of the terminal will be described.

The cell reselection information is a type of a cell reselection parameter and may be transmitted and provided to the terminal while being included in the system information broadcasted from the network. The cell reselection parameter provided to the terminal may include following types.

Cell reselection priority cellReselectionPriority: The cellReselectionPriority parameter specifies a priority with respect to a frequency of the E-UTRAN, a frequency of a UTRAN, a group of GERAN frequencies, a band glass of a CDMA2000 HRPD or a band glass of a CDMA2000 1xRTT.

$Qoffset_{s,n}$: specifies an offset value between two cells.

$Qoffset_{frequency}$: specifies frequency specific offset with respect to an E-UTRAN frequency having the same priority.

$Q_{hyst}$: specifies a hysteresis value with respect a rank index.

$Q_{qualmin}$: specifies a required minimum quality level in a dB unit.

$Q_{rxlevmin}$: specifies a required minimum Rx in a dB unit.

$Treeselection_{EUTRA}$: may specify a cell reselection timer value for the E-UTRAN, and may be configured with respect to each frequency of the E-UTRAN.

$Treeselection_{UTRAN}$: specifies a cell reselection timer value for the UTRAN.

$Treeselection_{GERA}$: specifies a cell reselection timer value for the GERAN.

$Treeselection_{CDMA\_HRPD}$: specifies a cell reselection timer value for CDMA HRPD.

$Treeselection_{CDMA\_1xRTT}$: specifies a cell reselection timer value for CDMA 1xRTT.

$Thresh_{x,\ HighP}$: specifies a Srxlev threshold value used by a terminal upon cell reselection to an RAT/frequency having a priority higher than a serving frequency. A specific threshold value may be independently configured with respect to each frequency of the E-UTRAN and the UTRAN, each group of a GERAN frequency, each band glass of CDMA2000 HRPD and each band glass of CDMA2000 1xRTT.

$Thresh_{x,\ HighQ}$: When cell reselection to RAT/frequency having a priority higher than the serving frequency is performed, a Squal threshold value used by a terminal is specified in a dB unit. The specific threshold value may be independently configured with respect to each frequency of the E-UTRAN and a UTRAN FDD.

$Thresh_{x,\ LowP}$: When cell reselection to RAT/frequency having a priority lower than the serving frequency is performed, a Srxlev threshold value used by a terminal is specified in a dB unit. The specific threshold value may be independently configured with respect to each frequency of the E-UTRAN and a UTRAN FDD, each group of a GERAN frequency, each band glass of a CDMA2000 HRPD and each band glass of CDMA2000 1xRTT.

$Thresh_{x,\ LowQ}$: When cell reselection to RAT/frequency having a priority lower than the serving frequency is performed, a Squal threshold value used by a terminal is specified in a dB unit. The specific threshold value may be independently configured with respect to each frequency of the E-UTRAN and a UTRAN FDD.

$Thresh_{Serving,\ LowP}$: When cell reselection to RAT/frequency having a priority lower than the serving frequency is performed, a Srxlev threshold value used by a terminal is specified in a dB unit.

$Thresh_{Serving,\ LowQ}$: When cell reselection to RAT/frequency having a priority lower than the serving frequency is performed, a Squal threshold value used by a terminal is specified in a dB unit.

$S_{IntraSerachP}$: specifies a Srxlev threshold value with respect to intra-frequency measurement in a dB unit.

$S_{IntraSerachQ}$: specifies a Squal threshold value with respect to intra-frequency measurement in a dB unit.

$S_{nonIntraSerachP}$: specifies E-UTRAN inter-frequency and a Srxlev threshold value with respect to inter-RAT measurement.

$S_{nonIntraSerachQ}$: specifies E-UTRAN inter-frequency and a Squal threshold value with respect to E-UTRAN inter-frequency and inter-RAT measurement.

Meanwhile, the cell reselection information may be provided while being included in a RRC connection release message which is a RRC message transmitted for RRC connection release between the network and the terminal. For example, the RRC connection release message may include a sub-carrier frequency list and cell reselection priority of the E-UTRAN, a sub-carrier frequency list and cell reselection priority of the UTRA-FDD, a sub-carrier frequency list and cell reselection priority of the UTRA-TDD, a sub-carrier frequency list and cell reselection priority of the GERAN, a band glass list and cell reselection priority of the CDMA2000 HRPD, and a band glass list and cell reselection priority of CDMA2000 1xRTT.

Hereinafter, radio link monitoring (RLM) will be described.

The terminal monitors downlink quality based on a cell-specific reference signal in order to detect downlink radio link quality of a PCell. The terminal estimates the downlink radio link quality for the purpose of monitoring downlink radio link quality of the PCell and compares the estimated downlink radio link quality with threshold values Qout and Qin. The threshold values Qout is defined as a level at which a downlink radio link may not be received, which corresponds to a 10% block error rate of hypothetical PDCCH transmission by taking into consideration a PDFICH error. The threshold value Qin is defined as a downlink radio link quality level which may be stable more than a level of the threshold value Qout, which corresponds to a 2% block error rate of hypothetical PDCCH transmission by taking into consideration the PCFICH error.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
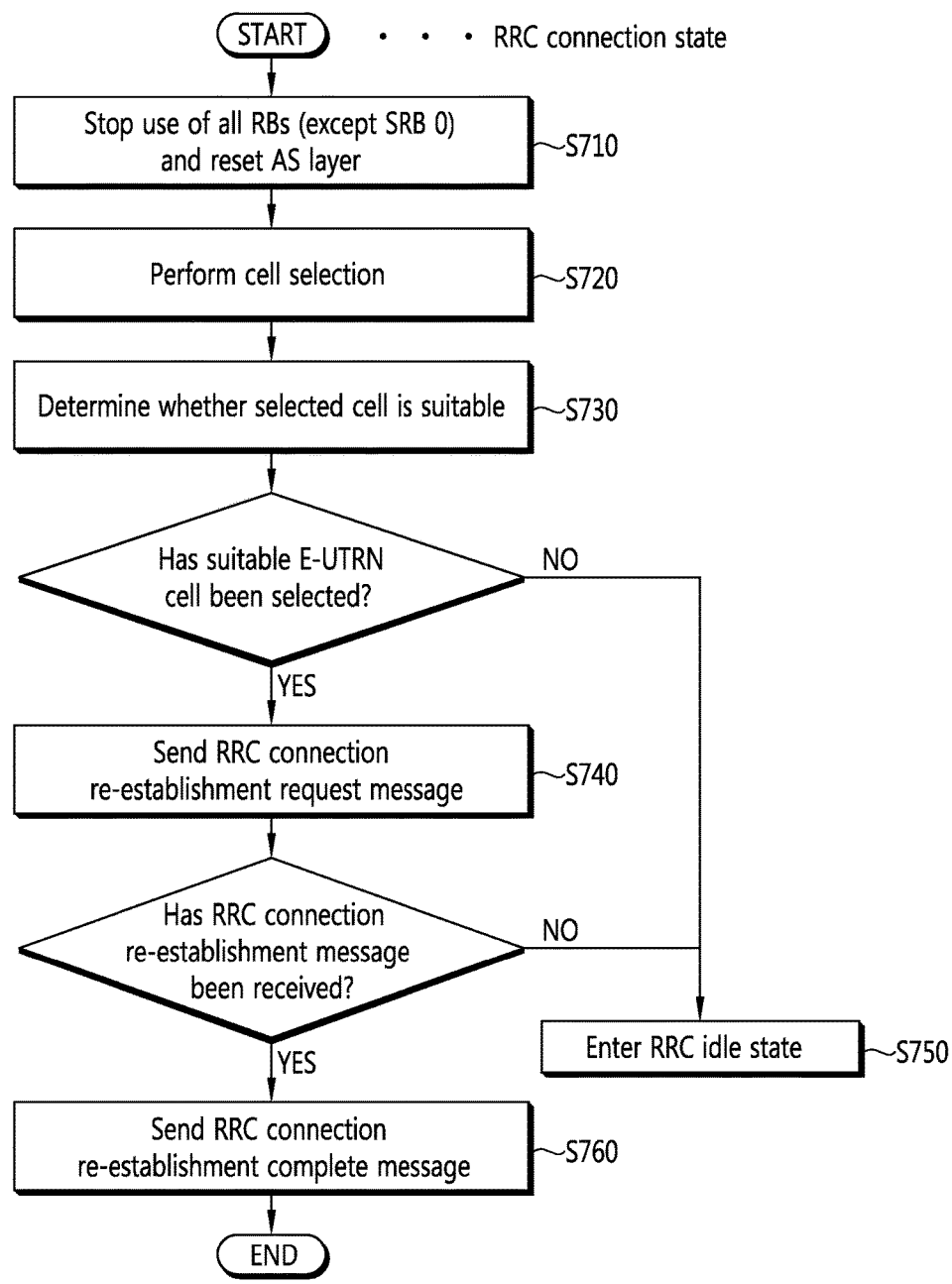
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
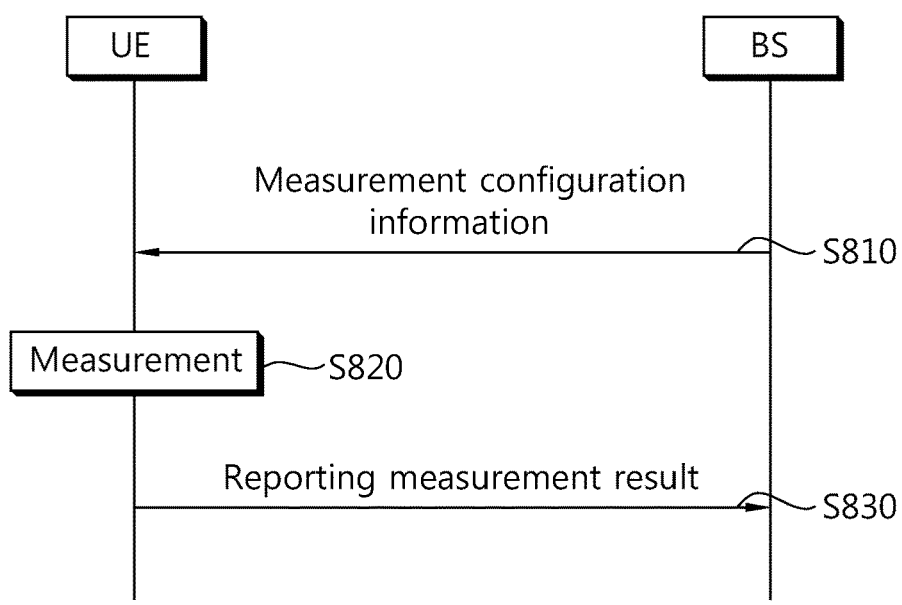
FIG. 8 is a flowchart illustrating a measuring method according to the related art.

FIG. 8 is a flowchart illustrating a measuring method according to the related art.

The terminal receives measurement configuration information from a base station (S810). A message including measurement configuration information refers to a measurement configuration message. The terminal performs measurement based on the measurement configuration information (S820). If the measurement result satisfies a report condition in the measurement configuration information, the terminal reports the measurement result to the base station. A message including the measurement result refers to a measurement report message.

The measurement configuration information may include following information.

(1) Measurement object information: represents information on an object to be measured by the terminal. The measurement object includes at least one of an intra-frequency measurement object being a measurement object in a cell, an inter-frequency measurement object being a measurement object between cells, and an inter-RAT measurement object being an inter-RAT measurement object. For example, the inter-frequency measurement object may indicate a neighboring cell having the same frequency band as that of the serving cell, the inter-frequency measurement object may indicate a neighboring cell having a frequency band different from that of the serving cell, and an inter-RAT measurement object may indicate a neighboring cell of a RAT different from that of the serving cell.

(2) Reporting configuration information: represents information on a reporting condition and a reporting type when transmission of the measurement result is reported. The reporting configuration information may be configured as a list of reporting configuration. Each reporting configuration may include a reporting criterion and a reporting format. The reporting criterion is a criterion triggering transmission of the measurement result by the terminal. The reporting criterion may include a period of a measurement reporting or a single event for the measurement reporting. The reporting format is information on which type the terminal configures the measurement result.

(3) Measurement identity information: represents information on a measurement identity to determine when the terminal reports a certain measurement object as a certain type by associating the measuring reporting with reporting configuration. The measurement identity information is included in the measurement reporting message, which may represent which measurement object is the measurement result and in which reporting condition the measurement reporting is generated.

(4) Quantity configuration information: represents information on a parameter for configuring filtering of a measurement unit, a reporting unit, and/or a measurement result value.

(5) Measurement gap information: represents information on a measurement gap which is an interval when the terminal may use for measurement without considering data transmission with the serving cell because downlink transmission or uplink transmission is not scheduled.

The terminal has a measurement object list, a measurement reporting configuration list, and a measurement identity list in order to perform a measurement procedure.

In the 3GPP LTE, the base station may configure only one measurement object with respect to one frequency band to the terminal According to section 5.5.4 of 3GPP TS 36.331 V8.5.0 (2009-March) "Evolved Universal Terrestrial Radio Access (E-UTRA) Radio Resource Control (RRC); Protocol specification (Release 8)", events resulting in the measurement reporting as listed in a following table 2 are defined.

TABLE 2

| Events | Reporting conditions |
| --- | --- |
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |

TABLE 2-continued

| Events | Reporting conditions |
| --- | --- |
| Event B2 | Serving becomes worse than threshold1 and inter RAT neighbor becomes better than threshold2 |

If the measurement result of the terminal satisfies the configured event, the terminal transmits a measurement reporting message to the base station.

Figure 9:
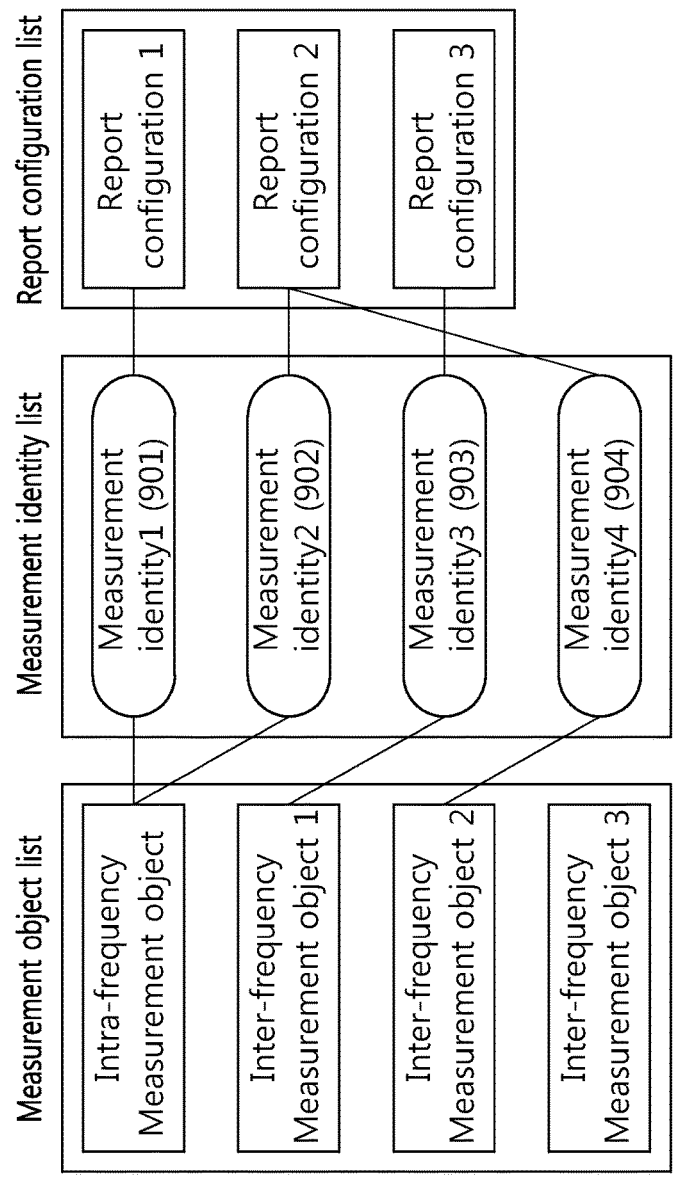
FIG. 9 illustrates an example of measurement configuration in the terminal.

FIG. 9 illustrates an example of measurement configuration in the terminal.

First, the measurement identity 1 (901) connects an intra-frequency measurement object with a reporting configuration 1. The terminal performs intra frequency measurement, and the reporting configuration 1 is used to determine criterion and type of the measurement result reporting.

As in the measurement identity 1 (901), the measurement identity 2 (902) is connected to the intra-frequency measurement object, but connects the intra-frequency measurement object to the reporting configuration 2. The terminal performs measurement and the reporting configuration 2 is used to determine criterion and type of the measurement result reporting.

According to a measurement identity 1 (901) and a measurement identity 2 (902), even if a measurement result with respect to the intra-frequency measurement object satisfies one of reporting configuration 1 and reporting configuration 2, the terminal transmits the measurement result.

The measurement identity 3 (903) connects the inter-frequency measurement object 1 to the reporting configuration 3. If the measurement result with respect to the inter-frequency measurement object 1 satisfies a reporting condition included in the reporting configuration 1, the terminal reports the measurement result.

The measurement identity 4 (904) connects the inter-frequency measurement object 2 to the reporting configuration 2. If the measurement result with respect to the inter-frequency measurement object 2 satisfies a reporting condition included in the reporting configuration 2, the terminal reports the measurement result.

Meanwhile, the measurement object, reporting configuration and/or measurement identity may be added, changed, and/or removed. This may be indicated by sending a new measurement configuration message or the measurement configuration change message to the terminal.

Figure 10:
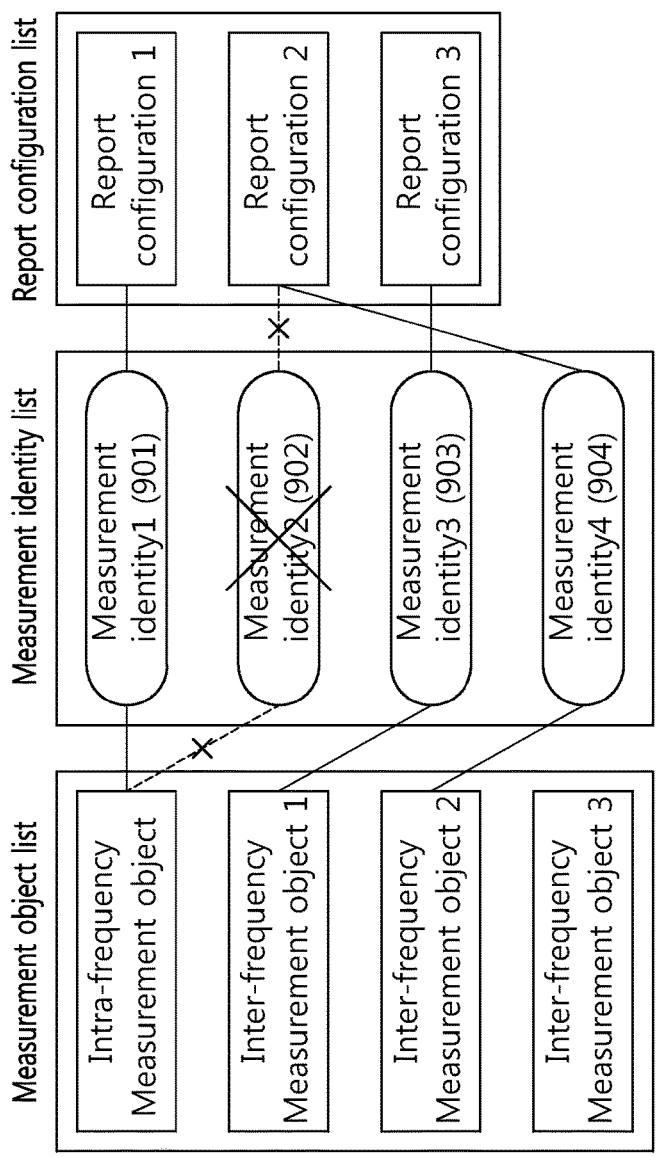
FIG. 10 illustrates an example of removing the measurement identity.

FIG. 10 illustrates an example of removing the measurement identity. If the measurement identity 2 (902) is removed, measurement with respect to a measurement object associated with the measurement identity 2 (902) is stopped and the measurement reporting is not transmitted. The measurement object associated with the removed measurement identity or the reporting configuration may not be changed.

Figure 11:
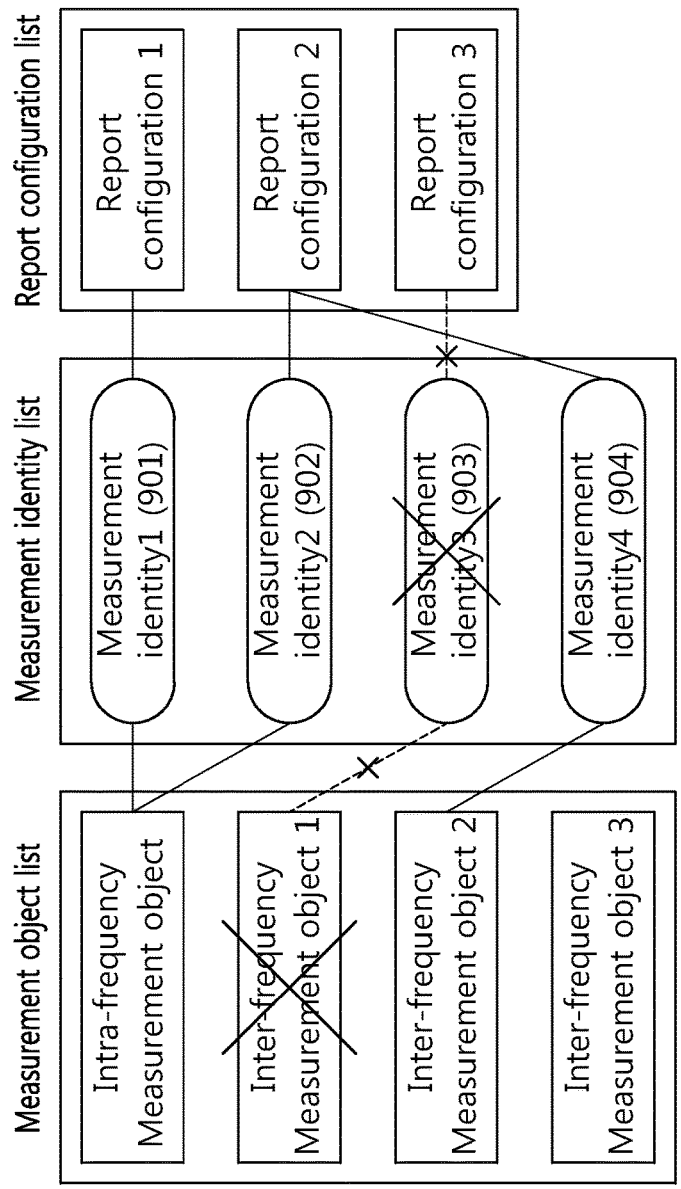
FIG. 11 illustrates an example of removing the measurement object.

FIG. 11 illustrates an example of removing the measurement object. If the inter-frequency measurement object 1 is removed, the terminal also remove the measurement identity 3 (903) associated with the inter-frequency measurement object 1. Measurement with respect to the inter-frequency measurement object 1 is stopped and the measurement reporting is not transmitted. However, the reporting configuration associated with the remove inter-frequency measurement object 1 may not be changed or removed.

If the reporting configuration is removed, the terminal also removes a measurement identity associated with the reporting configuration. The terminal stops measurement with respect to the measurement object associated with the associated measurement identity. However, the measurement object associated with the removed reporting configuration may not be changed or removed.

The measurement reporting may include a measurement identity, measured quality of the serving cell and a measurement result of the neighboring cell. The measurement identity identifies a measurement object to which the measurement report is triggered. The measurement result of the neighboring cell may include a cell identity and measured quality of the neighboring cell. The measured quality may include at least one of Reference Signal Received Power (RSRP) and Reference Signal Received Quality (RSRQ).

Figure 12:
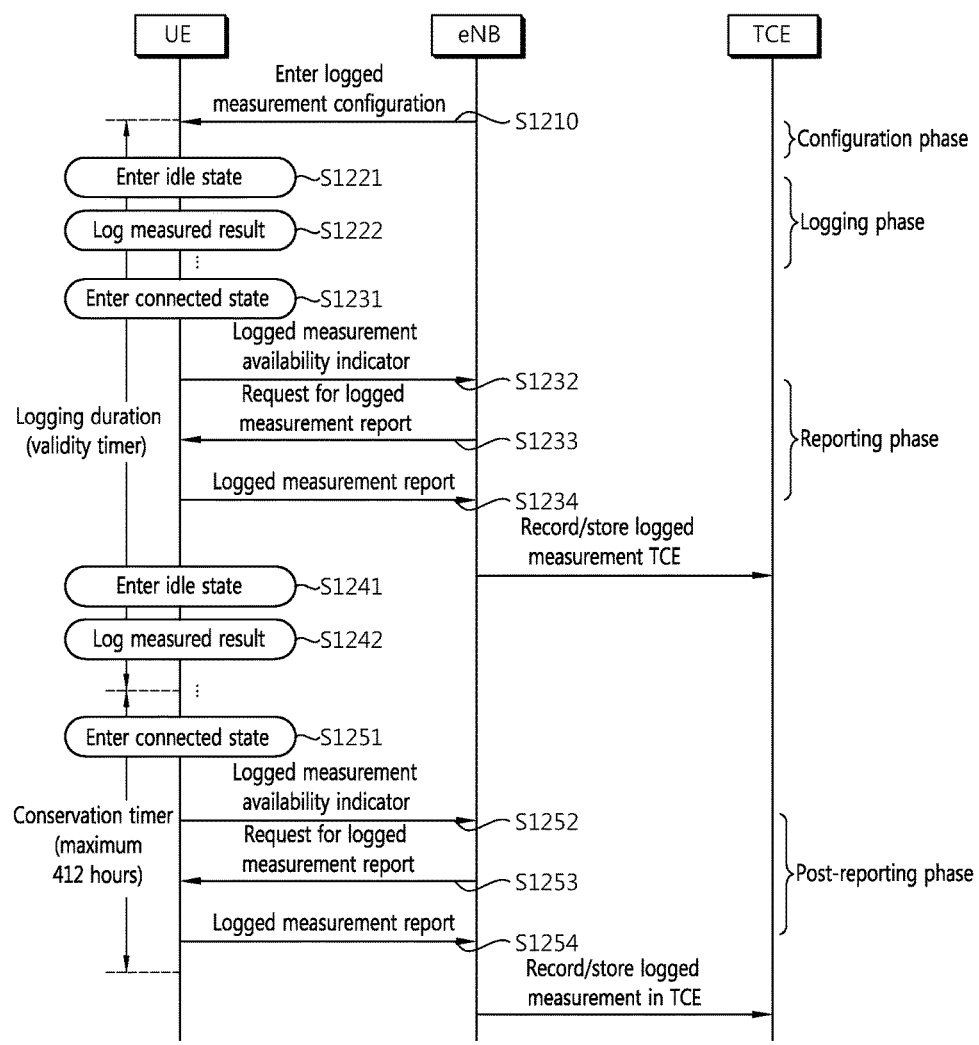
FIG. 12 is a flowchart illustrating a method for performing a logged MDT.

FIG. 12 is a flowchart illustrating a method for performing a logged MDT.

Referring to FIG. 12, UE receives a logged measurement configuration (S1210). The logged measurement configuration may be included in an RRC message and transmitted as a downlink control channel. The logged measurement configuration may include at least one of pieces of information about a TCE ID, a reference time that is a criterion in performing logging, logging duration, a logging interval, and an area configuration. The logging interval is indicative of an interval in which a measured result is stored. The logging duration is indicative of duration in which UE performs a logged MDT. The reference time is indicative of the time, that is, a criterion for duration in which a logged MDT is performed. The area configuration is indicative of an area on which UE has been requested to perform logging.

Meanwhile, the UE starts a validity timer when it receives the logged measurement configuration. The validity timer means the lifetime of the logged measurement configuration, and may be specified based on information about logging duration. The duration of the validity timer may also indicate the validity of a measured result owned by the UE in addition to the valid lifetime of the logged measurement configuration.

A procedure in which the UE receives the logged measurement configuration and a corresponding overall procedure is performed as described above is called a configuration phase.

When the UE enters an RRC idle state (S1221), the UE logs a measured result while the validity timer is driven (S1222). The value of the measured result may be RSRP, RSRQ, Received Signal Code Power (RSCP), or Ec/No. Information obtained by logging the measured result is called a logged measurement and/or a measured result log. A temporal phase in which UE logs a measured result more than once is called a logging phase.

The execution of a logged MDT based on a logged measurement configuration by UE may be changed depending on a place where the UE is present.

Figure 13:
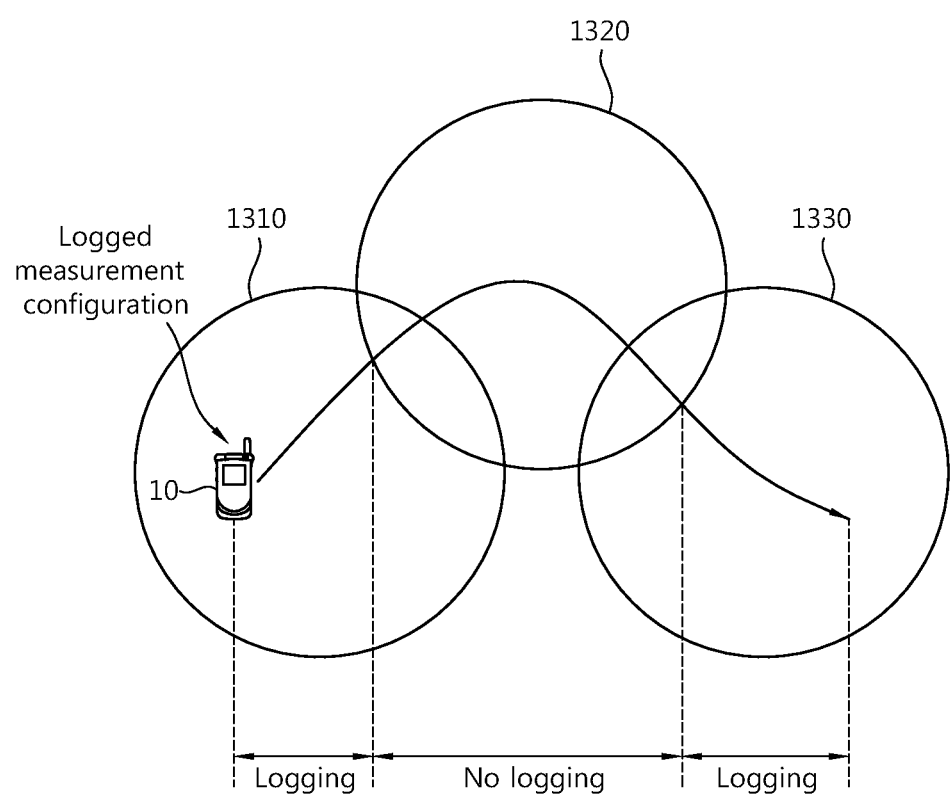
FIG. 13 is a diagram illustrating an example of a logged MDT according to a logging area.

FIG. 13 is a diagram illustrating an example of a logged MDT according to a logging area.

A network may configure a logging area, that is, an area in which UE needs to perform logging. The logging area may be represented in the form of a cell list or may be represented in the form of a tracking area/location area list. If a logging area has been configured for the UE, the UE stops logging when it deviates from the logging area.

Referring to FIG. 13, a first area 1310 and a third area 1330 are areas configured as a logging area, and a second area 1320 is an area in which logging is not permitted. The UE performs logging in the first area 1310, but does not perform logging in the second area 1320. The UE performs logging again when it moves from the second area 1320 to the third area 1330.

Figure 14:
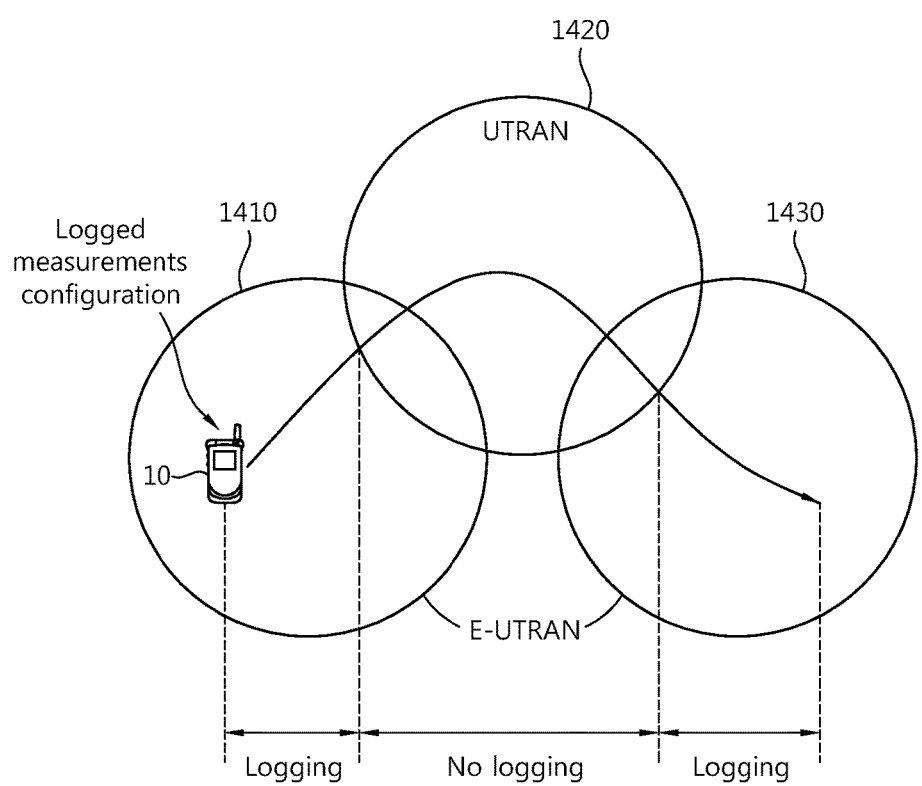
FIG. 14 is a diagram illustrating an example of a logged MDT according to a change of an RAT.

FIG. 14 is a diagram illustrating an example of a logged MDT according to a change of an RAT.

UE performs logging only when it camps on an RAT through which a logged measurement configuration has been received, but stops logging in other RATs. In this case, the UE may log cell information of another RAT in addition to the RAT in which the UE camps on.

A first area 1410 and a third area 1430 are E-UTRAN areas, and a second area 1420 is a UTRAN area. A logged measurement configuration is received from the E-UTRAN. The UE does not perform MDT measurements when it enters the second area 1420.

Referring back to FIG. 12, if the UE enters an RRC connected state (S1231) and has logged measurements to be reported, the UE notifies an eNB that it has the logged measurements to be reported (S1232). When the UE has established RRC connection or re-established RRC connection or RRC connection is reconfigured, the UE may notify the eNB that it has the logged measurements. Furthermore, if the UE performs handover, it may notify a target handover cell that it has the logged measurements. To notify, by the UE, the eNB of the logged measurements may include including a logged measurement availability indicator, that is, indication information providing notification of the presence of the logged measurements, in an RRC message transmitted from the UE to the eNB and sending the RRC message. The RRC message may be an RRC connection establishment-complete message, an RRC connection re-establishment-complete message, an RRC reconfiguration-complete message, or a handover-complete message.

When the eNB receives a signal providing notification of the presence of the logged measurements from the UE, it requests the UE to report the logged measurements (S1233). To request the report on the logged measurements may include including a logged measurement reporting request parameter regarding information indicative of the logged measurements in an RRC message and sending the RRC message. The RRC message may be a UE information request message.

When the UE receives the request for the report on the logged measurements from the eNB, it reports the logged measurements to the eNB (S1234). To report the logged measurements to the eNB may include including a logged measurement report, including the logged measurements, in an RRC message and sending the RRC message to the eNB. The RRC message may be a UE information report message. In reporting the logged measurements, the UE may report all of the logged measurements owned by the UE to the eNB or some of the logged measurements owned by the UE to the eNB at a point of time at which the report is made. If some of the logged measurements owned by the UE is reported, the reported some logged measurements may be discarded.

A phase in which a process of notifying, by UE, an eNB of the presence of logged measurements, receiving a request for a report from the eNB, and reporting the logged measurements is performed as described above is called a reporting phase.

While a logged MDT is performed, a subject measured by UE is chiefly related to a wireless environment. The MDT measurements may include a cell identity and the signal quality and/or signal intensity of a cell. The MDT measurements may include a measurement time and a measurement place. Table 3 below illustrates contents logged by UE.

TABLE 3

| PARAMETER (SET) | DESCRIPTION |
|---|---|
| Serving cell identity | Global cell identity of a serving cell |
| Measured result of serving cell | Measured Reference Signal Received Power (RSRP) of a serving cell |
| | Measured Reference Signal Received Quality (RSRQ) of a serving cell |
| Measured result of neighbor cell | Cell identities of measured E-UTRA cells, Measured result of E-UTRA cells |
| | Cell identities of measured UTRA cells, Measured result of UTRA cells |
| | Cell Identities of measured GERAN cells, Measured result of GERAN cells |
| | Cell Identities of measured CDMA 2000 cells, Measured result of CDMA 2000 cells |
| Time stamp | The moment of a logging measured result, calculated as {current time minus absoluteTimeStamp} in seconds |
| Location information | Detailed location information at the moment of logging |

Information logged at different logging points of time may be stored so that it is divided into different log entries as follows.

Figure 15:
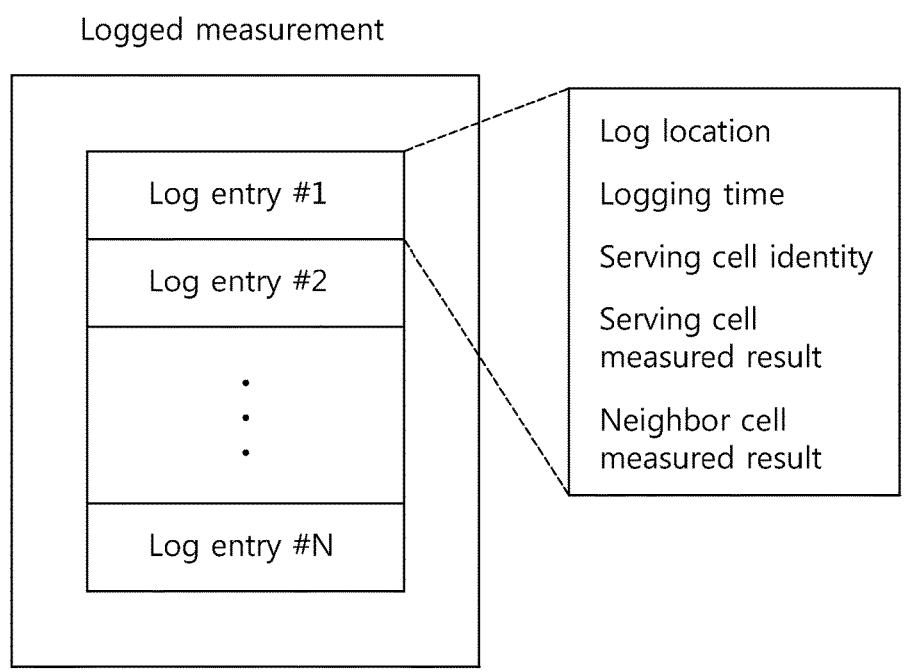
FIG. 15 is a diagram illustrating an example of logged measurements.

FIG. 15 is a diagram illustrating an example of logged measurements.

The logged measurements include one or more log entries.

The log entry includes a logging location, a logging time, a serving cell identity, a serving measured result, and a neighbor cell measured result.

The logging location is indicative of a location in which UE has performed measurements. The logging time is indicative of the time when UE performed measurements. Information logged on a different logging time is stored in a different log entry.

The serving cell identity may include a cell identity in Layer 3, which is called a Global Cell Identity (GCI). The GCI is a set of a Physical Cell Identity (PCI) and a PLMN identity.

Meanwhile, UE may analyze and log indices related to performance of the UE in addition to a wireless environment. For example, the indices may include a throughput and an erroneous transmission/reception rate).

Referring back to FIG. 12, the aforementioned logging phase and reporting phase may be present in the logging duration in plural times (S1241, S1242).

The eNB may record/store the logged measurements in a TCE when it receives a report on the logged measurements.

After the validity timer expires, that is, after a lapse of the logging duration, if the UE has logged measurements that have not yet been reported, the UE performs a procedure for reporting the logged measurements to the eNB. A phase in which an overall procedure for reporting the logged measurements to the eNB is performed is called a post-reporting phase.

After the logging duration is terminated, the UE discards the logged measurement configuration and starts a conservation timer. After the logging duration is terminated, the UE stops MDT measurements. However already logged measurements remain without being discarded. The conservation timer is indicative of the lifetime of the remaining logged measurements.

If the UE enters an RRC connected state before the conservation timer expires (S1251), the UE may report logged measurements that have not yet been reported to the eNB. In this case, the aforementioned procedures for reporting the logged measurements may be performed (S1252, S1253, and S1254). When the conservation timer expires, the remaining logged measurements may be discarded. The eNB may record/store the logged measurements when a report on the logged measurements is received.

The conservation timer may be fixed to a predetermined value for the UE and may be previously set in the UE. For example, the value of the conservation timer may be 48 hours. Alternatively, the value of the conservation timer may be included in a logged measurement configuration and delivered to the UE or may be included another RRC message and delivered to the UE.

Meanwhile, when a new logged measurement configuration is transferred to the UE, the UE may update an existing logged measurement configuration with the newly obtained logged measurement configuration. In this case, a validity timer may be started again from the time when the logged measurement configuration is newly received. Furthermore, logged measurements based on a prior logged measurement configuration may be discarded.

Figure 16:
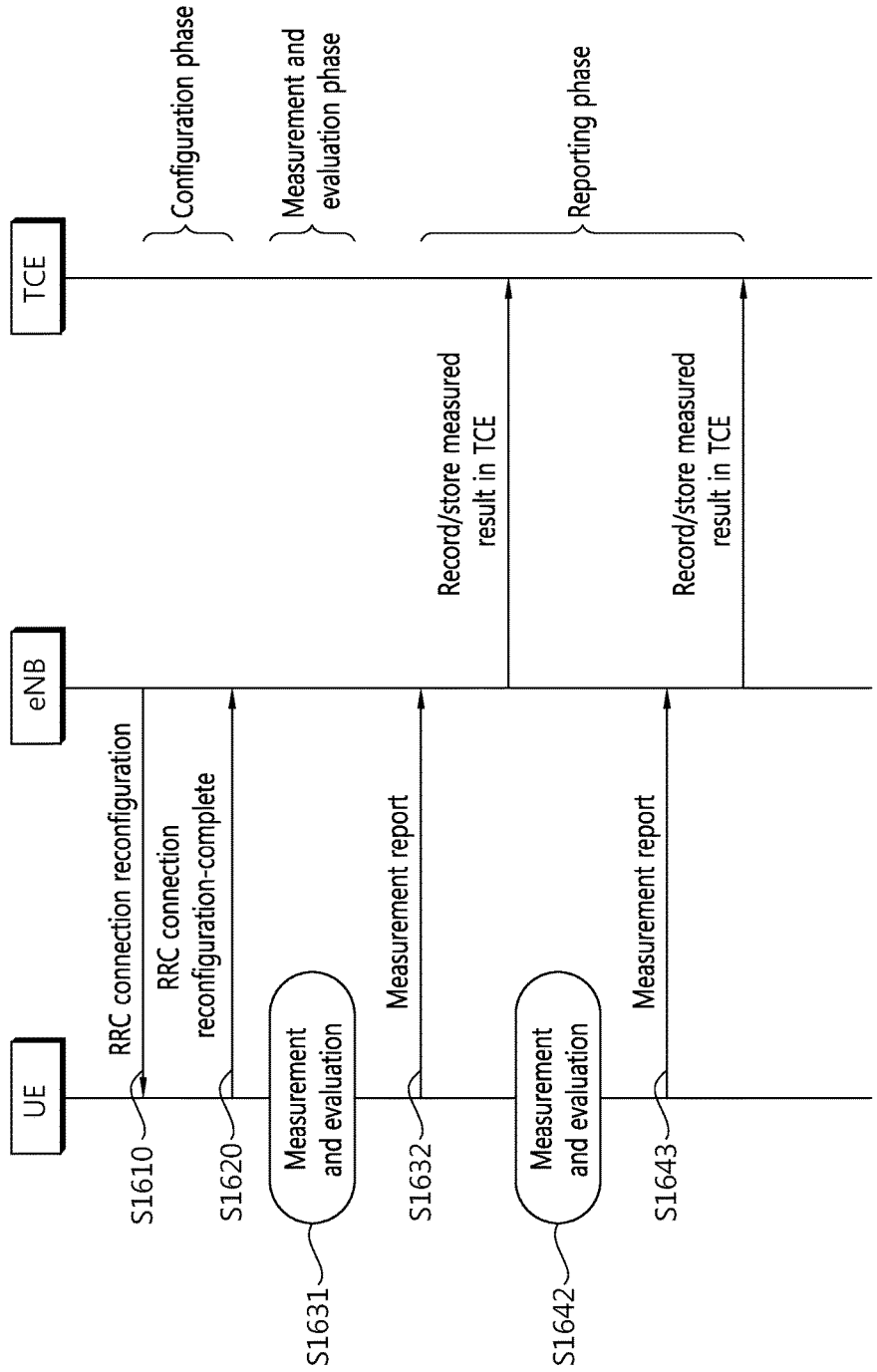
FIG. 16 is a diagram illustrating an example of an immediate MDT.

FIG. 16 is a diagram illustrating an example of an immediate MDT. The immediate MDT is based on a Radio Resource Management (RRM) measurement and report mechanism. In addition, information related to a location is added when a measured report is made and reported to an eNB.

Referring to FIG. 16, UE receives an RRC connection reconfiguration message (S1610) and sends an RRC connection reconfiguration-complete message (S1620). Accordingly, the UE enters an RRC connected state. The UE may receive a measurement configuration by receiving the RRC connection reconfiguration message. In the example of FIG. 16, the measurement configuration is received through the RRC connection reconfiguration message, but may be included in an RRC message according to an example and transmitted.

The UE performs measurements and evaluations in the RRC connected state (S1631) and reports a measured result to an eNB (S1632). In an immediate MDT, the measured result may provide accurate location information, if possible, as in an example of Global Navigation Satellite System (GNSS) location information. For location measurement, such as an RF fingerprint, neighbor cell measurement information that may be used to determine the location of the UE may be provided.

From FIG. 16, it may be seen that even after the prior measurements and evaluations (S1631) and report (S1632), the UE reports a measured result to the eNB (S1642) right after performing measurements and evaluations (S1641). This may be said to be the greatest difference between a logged MDT and an immediate MDT.

A Multimedia Broadcast and Multicast Service (MBMS) is described in detail below.

A logical channel MCCH channel or MTCH channel may be mapped to a transport channel MCH channel for the MBMS. The MCCH channel sends an MBMS-related RRC message, and the MTCH channel sends traffic of a specific MBMS service. A single MCCH channel is present in each MBMS Single Frequency Network (MBSFN) area in which the same MBMS information/traffic is transmitted. If a single cell provides a plurality of MBSFN areas, UE may receive a plurality of MCCH channels. If an MBMS-related RRC message is changed in a specific MCCH channel, a PDCCH channel sends an indicator indicative of an MBMS Radio Network Temporary Identity (M-RNTI) and a specific MCCH channel. UE supporting the MBMS may receive the M-RNTI and the MCCH indicator through the PDCCH channel, may check that the MBMS-related RRC message has been changed in a specific MCCH channel, and may receive the specific MCCH channel. The RRC message of the MCCH channel may be changed for each change cycle and repeatedly broadcasted for each repetition cycle.

UE may also be provided with a dedicated service while it is provided with an MBMS service. For example, a user may watch TV through an MBMS service through his or her smart phone and simultaneously perform chatting using an Instant Messaging (IM) service, such as MSN or Skype, using the smart phone. In this case, the MBMS service is provided through an MTCH received by several UE, and a service provided to each UE, such as an IM service, may be provided through a dedicated bearer, such as a DCCH or DTCH.

In one area, a specific eNB may use several frequencies at the same time. In this case, in order to efficiently use radio resources, a network may select one of the several frequencies, may provide an MBMS service only the selected frequency, and may provide dedicated bearers to respective UEs in all the frequencies.

In this case, if UE provided with a service using a dedicated bearer in a frequency through which the MBMS service is not provided wants to receive the MBMS service, the UE need to perform handover to the frequency through which the MBMS service is provided. To this end, the UE sends an MBMS interest indication to an eNB. That is, if the UE wants to receive the MBMS service, it sends an MBMS interest indication to the eNB. When the indication is received, the eNB recognizes that the UE wants to receive the MBMS service and moves the UE to the frequency through which the MBMS service is provided. In this case, the MBMS interest indication means information indicating that the UE wants to receive the MBMS service and additionally includes information about a frequency to which the UE wants to move.

UE that wants to receive a specific MBMS service first checks frequency information and broadcasting time information through which the specific MBMS service is provided. If the MBMS service is already broadcasted or starts to be broadcasted, the UE sets the highest priority in a frequency through which the MBMS service is provided. The UE moves to a cell that provides the MBMS service by performing a cell reselection procedure using the reconfigured frequency priority information, and receives the MBMS service.

If UE receives an MBMS service or is interested to receiving an MBMS service and if UE is able to receive an MBMS service while it camps on a frequency through which the MBMS service is provided, the highest priority may be considered to have been applied to the corresponding frequency during an MBMS session as long as the following situation continues in the state in which a reselected cell broadcasts SIB13.

If the inclusion of one or more MBMS Service Area Identities (SAIs) in the User Service Description (USD) of a corresponding service is indicated by SIB15 of a serving cell.

If SIB15 is not broadcasted within a serving cell and a corresponding frequency is included in the USD of a corresponding service.

The aforementioned MDT may be applied in relation to an MBMS. A network may enable specific UE to report information related to an MBMS to the network. A series of procedures, including a corresponding configuration from a network and/or an UE MBMS information reporting operation, may be implemented as in the aforementioned MDT, which may be called an MBMS MDT.

A network may select UE for an MBMS MDT based on the capabilities of the UE and/or the consent of a user. However, an MBMS service is broadcasted and provided on an MBSFN area, and UE provided with the MBMS service does not provide corresponding feedback. Accordingly, the network rarely checks the MBMS reception status of the UE. Accordingly, the network may perform a configuration in UE so that MBMS MDT management is performed regardless of the MBMS reception status of the UE.

When UE measures MBMS transmission related to an MBMS service that is not interested, the UE consumes power for the purpose of the reporting of MBMS information. If the reporting of MBMS information depends on the improvement of MBMS service reception from a viewpoint of a user, excessive consumption of UE-side power attributable to the improvement may not be preferred. Accordingly, a method capable of improving MBMS service reception for UE while preventing excessive consumption of UE-side power needs to be proposed.

Figure 17:
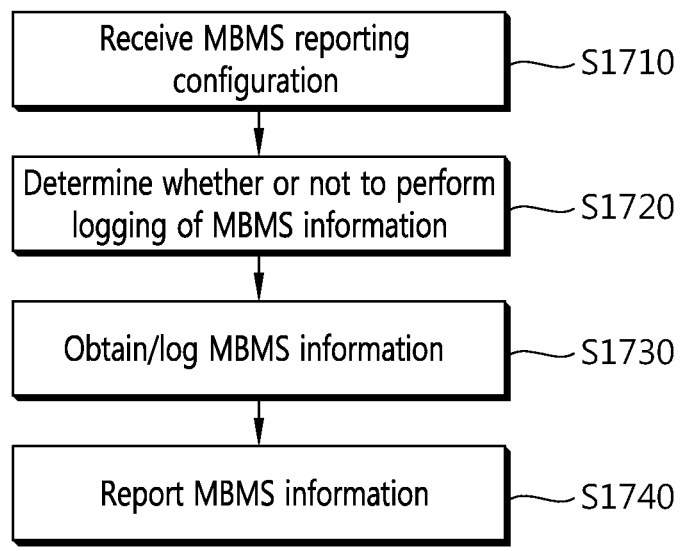
FIG. 17 is a diagram illustrating a method for reporting MBMS information in accordance with an embodiment of the present invention.

FIG. 17 is a diagram illustrating a method for reporting MBMS information in accordance with an embodiment of the present invention.

Referring to FIG. 17, UE receives an MBMS reporting configuration from a network (S1710). The MBMS reporting configuration may include configuration information for obtaining, logging, and reporting information related to the MBMS service reception of the UE. The configuration information set in the UE through the MBMS reporting configuration may be implemented as follows.

(1) The MBMS reporting configuration may include MBMS logging execution information. The MBMS logging execution information may be information specifying that the UE will obtain and log MBMS information when and how. The MBMS logging execution information may include the following lower information.

A logging scope: the logging scope is indicative of a logging permission scope, that is, a scope in which the acquisition of MBMS information by UE is permitted. The logging permission scope may be limited to a limited area, a limited channel, a limited service, etc. The logging permission scope may be specified as follows.

(a) A specific MBMS service area: an MBMS SAI list including one or more MBMS SAIs (b) A specific MBSFN area: an MBSFN area ID list including one or more MBSFN area IDs (c) A specific PMCH: a PMCH for sending a specific MBMS service and/or specific MBMS control information and specified by an MBSFN area list and a PMCH list (d) A specific MTCH: an MTCH for carrying a specific MBMS service and specified through a TMGI list (e) A specific PLMN: a PLMN list including a specific PLMN ID providing an interest MBMS service, the RPLMN of UE Logging duration: the logging duration indicates duration in which UE that has determined to perform the acquisition/logging of MBMS information obtains and logs the MBMS information. A point of time at which logging duration starts may be a point of time at which an MBMS reporting configuration is received or a point of time at which the acquisition/logging of MBMS information are first started.

A logging interval: the logging interval indicates a time interval in which UE performs the acquisition/logging of MBMS information during logging duration. If information indicative of a logging interval is included in MBMS logging execution information, UE may periodically perform the acquisition/logging of MBMS information at the logging interval during logging duration.

A logging event: the logging event may specify an event that UE triggers the acquisition/logging of MBMS information during logging duration. If information specifying a logging event is included in MBMS logging execution information, UE may perform the acquisition/logging of MBMS information according to the logging event during logging duration.

(2) An MBMS reporting configuration may include MBMS logging purpose information. The MBMS logging purpose information may indicate that an operation according to an MBMS reporting configuration is for MBMS information reporting. That is, the MBMS logging purpose information may indicate that the operation according to the MBMS reporting configuration is for an MBMS MDT.

A reporting configuration transmitted to UE may include MBMS logging purpose information indicative of an object of logging. The MBMS logging purpose information may indicate the report of MBMS information by UE. The logging purpose information may indicate an MBMS MDT.

(3) The MBMS reporting configuration may include MBMS logging target information which specifies MBMS information to be obtained and logged by UE. The MBMS logging target information may specify the content of MBMS information to be obtained through measurements by UE.

(4) The MBMS reporting configuration may include MBMS reporting condition information indicative of a condition in which logged MBMS information is reported. The MBMS reporting condition information may specify when, where and/or how logged MBMS information will be reported. An MBMS reporting condition may include the following information.

A report cycle: a cycle in which logged MBMS information is reported

A reporting event: an event (e.g., an MBMS service failure, an MBMS service deterioration, an RRC connected state, etc.) for triggering the reporting of logged MBMS information (5) The MBMS reporting configuration may further include a trace parameter. The trace parameter may include at least one of a trace reference parameter, a trace recording session reference, and a TCE ID.

The MBMS reporting configuration may be provided to UE through broadcast signaling (e.g., signaling through a BCCH and/or an MCCH). UE may receive an MBMS reporting configuration provided through broadcast signaling and may determine whether there is user consent for an MBMS information report according to the MBMS reporting configuration. If user consent is present, the UE may determine to apply the MBMS reporting configuration. If user consent is not present, the UE may neglect the received MBMS reporting configuration. In this case, the user consent for performing the MBMS information report may be previously set in the UE or may be set in an application which uses Open Mobile Alliance (OAM) Device Management (DM), for example.

The MBMS reporting configuration may be provided to UE through dedicated signaling (e.g., signaling through a DCCH, etc.). An RRC message for the MBMS reporting configuration may be newly defined. Alternatively, the MBMS reporting configuration may be further included in an existing RRC message. For example, the MBMS reporting configuration may be additionally included in a logged measurement configuration message. If a logged measurement configuration is used through a logged measurement configuration message, the logged measurement configuration message may be required to indicate whether UE will perform an MBMS information report. To this end, the aforementioned MBMS logging purpose information may be included in the logged measurement configuration message. Meanwhile, if a logged measurement configuration message is solely used for an MBMS information report, the logged measurement configuration message may further include information indicating that measurement logging for a logged MDT needs to be omitted.

The UE determines whether the logging of the MBMS information is permitted (S1720). The determination of whether the logging of the MBMS information by the UE is permitted may include determining whether the logging of the MBMS information is permitted based on a logging scope configured in the UE. The logging scope may be configured in such a manner that it is included in the aforementioned MBMS reporting configuration and provided to the UE or may have been previously configured in the UE. The UE may determine that the logging of the MBMS information is permitted within a logging permission scope indicated by the logging scope. The UE may determine whether the logging of the MBMS information is permitted based on the logging scope configured in the UE as follows.

(1) A specific MBMS service area: if the logging scope of an MBMS reporting configuration has been configured as a specific MBMS service area, UE may determine that the logging of MBMS information is permitted when the UE is placed within the specific MBMS service area. If the logging scope of an MBMS reporting configuration has been configured as an MBMS SAI list including one or more MBMS SAIs, UE may determine that the logging of MBMS information is permitted if an MBMS SAI related to an MBMS service that is being provided by a current cell or that may be provided by the current cell is included in the MBMS SAI list. In contrast, if the MBMS SAI of a corresponding cell is not included in the MBMS SAI list, the UE may determine that the logging of the MBMS information is not permitted.

(2) A specific MBSFN area: if the logging scope of an MBMS reporting configuration has been configured as a specific MBMS service area, UE may determine that the logging of MBMS information is permitted with the UE is placed within the specific MBSFN area. If the logging scope of an MBMS reporting configuration has been configured as an MBSFN area list including one or more MBSFN area IDs, UE may determine that the logging of MBMS information is permitted if an MBSFN area ID related to an MBMS service that is being provided by a current cell and that may be provided by the current cell is included in the MBSFN area list. In contrast, if the MBSFN area ID of a corresponding cell is not included in the MBMS area list, the UE may determine that the logging of the MBMS information is not permitted.

(3) A specific PMCH: if the logging scope of an MBMS reporting configuration has been configured as a specific PMCH, UE may determine that the logging of the MBMS information has been permitted if an MBMS service is provided or may be provided through the specific PMCH. If a current cell provides MBMS control information and/or an MBMS service on a PMCH within a logging scope according to an MBMS reporting configuration, UE may determine that the logging of MBMS information is permitted. For example, if an MBSFN area ID related to MBMS control information and MBMS service provided by a current cell is included in an MBSFN area list and if a PMCH ID is included in a PMCH list, UE may determine that the logging of MBMS information is permitted. In contrast, if a corresponding cell provides MBMS control information and/or an MBMS service on a PMCH other than a logging scope according to an MBMS reporting configuration, UE may determine the logging of MBMS information is not permitted. For example, if an MBSFN area ID related to MBMS control information and/or an MBMS service provided by a current cell is not included in an MBFSN area list or if a PMCH ID is not included in a PMCH list, UE may determine the logging of MBMS information is not permitted.

(4) A specific MTCH: if the logging scope of an MBMS reporting configuration has been configured as a specific MTCH, UE may determine that the logging of MBMS information has been permitted if an MBMS service is provided or may be provided through a specific MTCH. If a current cell provides an MBMS service on an MTCH within a logging scope according to an MBMS reporting configuration, UE may determine that the logging of MBMS information is permitted. For example, if a TMGI related to an MBMS service provided by a current cell is included in the TMGI list of a logging area, UE may determine that the logging of MBMS information is permitted. In contrast, if a corresponding cell provides an MBMS service on an MTCH other than a logging scope according to an MBMS reporting configuration, UE may determine the logging of MBMS information is not permitted. For example, if a TMGI related to an MBMS service provided by a current cell is not included in the TMGI list of a logging area, UE may determine that the logging of MBMS information is not permitted. The specific MTCH transfers a specific MBMS service, and thus UE may determine whether the logging of MBMS information is permitted depending on the MBMS service.

(5) A specific PLMN: if the logging scope of an MBMS reporting configuration has been configured as a specific PLMN, UE may determine whether the logging of MBMS information is permitted based on the PLMN of a cell which provides and/or may provide an MBMS service.

If the logging scope of an MBMS reporting configuration has been configured as a PLMN list including one or more PLMN IDs, UE may determine that the logging of MBMS information for an MBMS service provided by a corresponding cell is permitted if the UE establishes an RRC connected state with the cell of a PLMN included in the PLMN list or camps on the cell. In contrast, if the UE establishes an RRC connected state with the cell of a PLMN not included in the PLMN list or camps on the cell, the UE may determine that the logging of MBMS information for an MBMS service provided by a corresponding cell is not permitted.

If the logging scope of an MBMS reporting configuration has been configured as the RPLMN of UE, the UE may determine the logging of MBMS information for an MBMS service provided by a corresponding cell is not permitted if the PLMN of a cell being camped on by the UE is an RPLMN. Alternatively, if the PLMN of a cell being camped on by the UE does not correspond to an RPLMN, the UE may determine that the logging of MBMS information for an MBMS service provided by a corresponding cell is not permitted.

One or more of the aforementioned criteria for determining whether the acquisition and logging of the MBMS information are permitted may be combined and implemented so that whether the acquisition and logging of the MBMS information are permitted is determined. For example, UE may determine whether the logging of MBMS information is permitted based on a logging scope in which an MBSFN area and a PLMN have been combined.

The UE which has determined that the acquisition and logging of the MBMS information have been permitted executes the acquisition and logging of the MBMS information (S1730). The UE may perform MBMS measurements in order to obtain the MBMS information. The UE may perform measurements on a frequency and/or subframe in which an (interest) MBMS service is provided and may obtain a measured result. The UE may include a result of the measurement of an MBMS service in MBMS information. Furthermore, the UE may include information about the location of the UE when obtaining and logging the MBMS information in the MBMS information.

The acquisition and logging of the MBMS information by the UE may be performed based on the MBMS logging execution information of the MBMS reporting configuration.

The acquisition and logging of the MBMS information by the UE may be periodically performed. To this end, an MBMS logging cycle may be set in the UE. The MBMS logging cycle may be set in the UE according to the logging interval of MBMS logging execution information included in an MBMS reporting configuration. The UE may perform MBMS measurements at a logging point of time according to the MBMS logging cycle, may obtain MBMS information including a measured result, and may log the MBMS information. For the periodic logging of MBMS information, a timer may be set. The timer may be set as an MBMS logging cycle value. The timer is restarted right after it expires, and the UE may obtain and log MBMS information when the timer expires.

The acquisition and logging of the MBMS information by the UE may be performed when a specific event occurs. To this end, an MBMS logging event may be set in the UE. The MBMS logging event may be set in the UE through the logging event of MBMS logging execution information included in an MBMS reporting configuration. In this case, the logging event may be related to the reception status of an MBMS service provided to the UE and/or the reception quality of the MBMS service. If the reception of an MBMS service fails or an MBMS service having lower quality than a specific threshold is received, the UE may perform MBMS measurements and may obtain and log MBMS information including a measured result.

UE may determine the acquisition and logging of MBMS information using which one of the two methods based on the configuration of a network. For example, separate information indicative of a method of obtaining and logging, by UE, MBMS information may be provided by a network. In another example, a method of obtaining and logging MBMS information may be indicated by an MBMS reporting configuration. If a logging interval is included in the MBMS reporting configuration, but a logging event is not included therein, the UE may perform the periodic acquisition and logging of MBMS information. If a logging event is included in the MBMS reporting configuration, but a logging interval is not included therein, the UE may perform the event-based acquisition and logging of MBMS information. If information indicative of a method of obtaining and logging MBMS information is included in the MBMS reporting configuration, the UE may perform the acquisition and logging of MBMS information according to the indicated method.

Alternatively, whether UE will obtain and log MBMS information based on which one of the two methods may be previously set in the UE.

When UE obtains and logs MBMS information, the logged MBMS information may be stored as one logged entry. Each of logged entries related to a piece of logged MBMS information may include the following numerated information.

(1) MBMS Control Information
MBMS service area information about the interest MBMS service of UE or an MBMS service being received by the UE (e.g., MBMS SAI)
MBSFN area information about the interest MBMS service of UE or an MBMS service being received by the UE (MBSFN area identity)
PMCH information (an MBSFN area ID and PMCH ID related to a corresponding MBMS service) related to each MBSFN area for the interest MBMS service of UE or an MBMS service that has been received by the UE
The Temporary Mobile Group Identity (TMGI) of the interest MBMS service of UE or an MBMS service that has been received by the UE
MBSFN subframe information (MBSFN-SubframeConfig)

(2) MBMS Cell Information
An MBMS cell means a cell which provides UE with an interest MBMS service on the frequency of the corresponding cell. An MBMS cell may have a meaning different from a serving cell on another frequency.
MBMS cell information may include an MBMS cell ID list. If a serving cell is different from an MBMS cell, the ID of a corresponding cell may be logged. If the frequency of a serving cell is different from the frequency of an MBMS cell, the ID of a corresponding cell may be logged.
MBMS cell information may include the frequency list of an MBMS cell which provides the interest MBMS service of UE or an MBMS service that has been received by the UE.
MBMS cell information may include the PLMN of an MBMS cell. If the PLMN of a corresponding MBMS cell is different from the RPLMN of UE, the PLMN of the MBMS cell may be included in MBMS cell information. Alternatively, if the PLMN of a corresponding MBMS cell corresponds to the RPLMN of UE, the PLMN of the MBMS cell may be included in MBMS cell information.
An indicator indicating whether an MBMS frequency is the same as the frequency of a serving cell on which UE now camps or with which the UE has established RRC connection may be included in MBMS cell information.

(3) Logging Reason Information
The logging reason information may indicate a logging reason for MBMS information logged by UE. The logging reason information may indicate whether the logged MBMS information is cyclic logging. The logging reason information may indicate whether the logged MBMS information is based on event-based logging. The logging reason information may be included in each log entry as unit MBMS information logged at a specific point of time and may be set to indicate a reason that a corresponding log entry has been logged. The logging reason information may be set to indicate the entire MBMS information logged at a plurality of points of time, that is, a reason that a plurality of log entries has been logged.

(4) MBMS Service Deterioration/Failure Reason Information

The MBMS service deterioration/failure reason information may be indicative of an MBMS service failure. An MCCH acquisition failure, an MBMS service reception failure from a cell on a frequency for the interest MBMS service of UE, an SIB13 acquisition failure (MCCH configuration acquisition failure), an SIB15 acquisition failure, entry into a cell that does not provide an MBMS service (e.g., entry into a CSG cell/cell in which an MBSFN subframe has not been configured/irregular cell/invalid cell/entry into a cell of a PLMN other than an rPLMN), and deviation from a regular camp state may be taken into consideration as the MBMS service failure.

The MBMS service deterioration/failure reason information may be indicative of the deterioration of MBMS service reception quality. The MBMS service deterioration/failure reason information may be indicative of a reason that has caused the deterioration of MBMS service reception quality.

(5) MBMS Service Reception Quality of Information

A Block Error Rate (BLER) per Modulation and Coding Scheme (MCS)

A BLER per MCS in each MBSFN area

If an MBMS-specific reference signal is to be measured, a measured result (RSRP, RSRQ) of a serving cell (6) MBMS Transmission Information An MCS applied to an MCCH An MCS applied to a PMCH (7) Wireless Measurements Information Serving cell information (a PCI, a GCI, a serving frequency, a tracking area, a PLMN list, etc.)

If a common reference signal has been measured, a measured result (RSRP, RSRQ) of a serving cell Neighbor cell information (a PCI, a neighbor cell frequency)

A measured result (RSRP, RSRQ) of a neighbor cell (8) Time Information

Logging time information (e.g., SS:MM:HH:DD)

Service deterioration time

A point of time at which the deterioration of service quality occurred

A point of time at which the deterioration of service quality was previously generated Service deterioration the duration An MBMS service deterioration occurrence indicator An indicator per log entry (9) Information about the Location of UE at a Point of Time at which MBMS Information is Logged (e.g., GPS, GNSS-Based Location Information)

The MBMS information that may be logged by the UE may be obtained and/or determined from a serving cell and/or a non-serving cell.

The UE reports the logged MBMS information to the network (S1740).

To report, by the UE, the logged MBMS information to the network may be performed as in an existing logged MDT. The UE may include a logged MBMS information availability indicator, indicating that there is logged MBMS information to be reported, in an RRC connection establishment-complete message, an RRC connection reconfiguration-complete message, or an RRC connection re-establishment-complete message, and send the message. When the reporting of the logged MBMS information is requested by the network, the UE may report the logged MBMS information to the network at a specific report time interval during an RRC connected state. The specific report time interval may be set by the network.

The reporting of the logged MBMS information by the UE may include immediately reporting the obtained and/or logged MBMS information to the network after MBMS measurements. When MBMS information is obtained, the UE may immediately report the MBMS information to the network without a request for a report by the network. UE in an RRC connected state may obtain MBMS information and immediately report the MBMS information to the network. After establishing an RRC connected state, UE in the RRC connected state may include MBMS information in an RRC connection establishment-complete message, an RRC connection re-establishment-complete message, or a separate RRC message and send the message to a network.

A detailed example of the method of reporting MBMS information in accordance with an embodiment of the present invention is described in detail below with reference to a figure.

Figure 18:
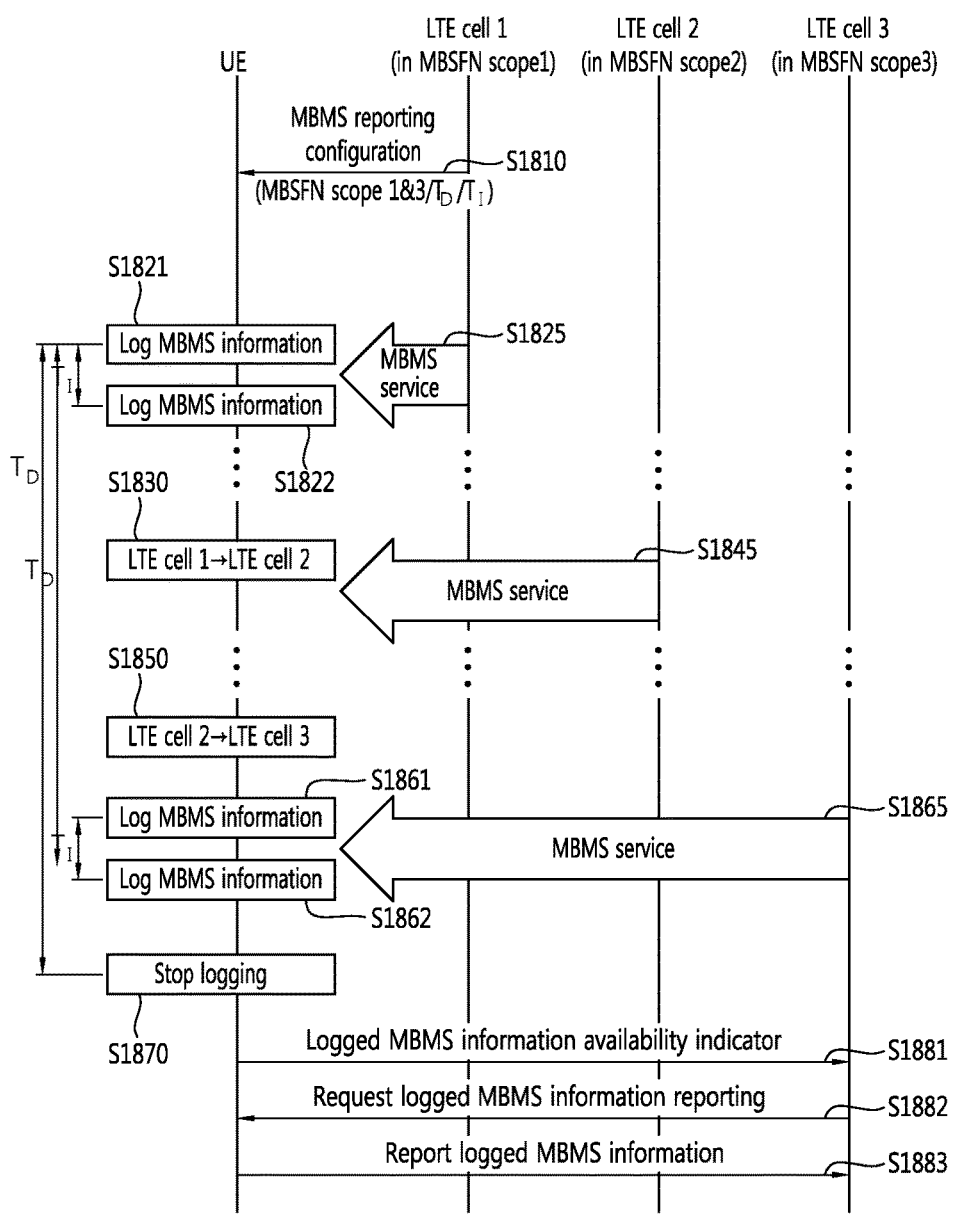
FIG. 18 is a diagram illustrating an example of a method for reporting MBMS information in accordance with an embodiment of the present invention.

FIG. 18 is a diagram illustrating an example of a method of reporting MBMS information in accordance with an embodiment of the present invention.

Referring to FIG. 18, UE receives an MBMS reporting configuration from an LTE cell 1 (S1810). The MBMS reporting configuration may be transmitted through dedicated signaling for the UE. In this case, the MBMS reporting configuration may be included in a specific RRC message and provided to the UE. Alternatively, the reporting configuration may be provided to the UE through broadcast signaling.

The MBMS reporting configuration may include a logging scope, logging duration $T_D$, and a logging interval $T_1$ as MBMS logging execution information. The logging scope may include an MBSFN area list including an MBSFN area in which logging is permitted. The MBSFN area list may include an MBSFN area1 and an MBSFN area3.

The UE camps on the LTE cell 1 and may receive system information transmitted by the LTE cell 1. The UE may be aware that the LTE cell 1 is an MBMS cell providing an MBMS service based on SIB3 of the system information received from the LTE cell 1. Furthermore, the UE may be aware that an MBSFN area related to an MBMS service provided by the LTE cell 1 is the MBSFN area1 through the SIB13. Since the MBSFN area1 is included in an MBSFN area list, the UE may determine that the logging of MBMS information is permitted.

The UE which has determined that the logging of MBMS information is permitted may periodically log MBMS information at the logging interval $T_I$ for the logging duration $T_D$. Accordingly, while the UE receives the MBMS service (S1825), the UE measures a reception signal related to the MBMS service and obtains and logs MBMS information (S1821, S1822). In order to obtain and log periodic MBMS information at the logging interval $T_1$, the UE may set and drive a timer. The timer may be set as the logging interval $T_1$, and the UE may execute the acquisition and logging of the MBMS information whenever the timer expires.

In order to obtain and log the MBMS information, the UE may perform wireless measurements on a frequency and/or subframe in which the MBMS service is received at the logging interval $T_1$. The UE may include a measured result in the MBMS information. Furthermore, at a point of time at which the MBMS information is obtained and logged, the UE may include location information indicative of the location of the UE in the MBMS information. The MBMS information obtained and logged by the UE may be implemented like the logged MBMS information described with reference to FIG. 17. MBMS information logged by the UE at each step may be logged as a single log entry.

While in motion, the UE may move from the LTE cell 1 to an LTE cell 2 (S1830). The cell movement of the UE may be performed through cell reselection and/or handover.

The UE camps on the LTE cell 2 and may receive system information transmitted by the LTE cell 2. The UE may be aware that the LTE cell 2 is an MBMS cell providing an MBMS service through SIB3 of the system information received from the LTE cell 2. Furthermore, the UE may be aware that an MBSFN area related to an MBMS service provided by the LTE cell 2 is an MBSFN area2 through the SIB13. Since the MBSFN area2 is not included in the MBSFN area list, the UE may determine that the logging of MBMS information is not permitted.

The UE which has determined that the logging of MBMS information is not permitted may not log MBMS information even during the logging duration $T_D$. Accordingly, although the UE receives the MBMS service (S1845), it may perform measurements on a frequency and/or subframe in which the MBMS service is provided.

While in motion, the UE may move from the LTE cell 2 to an LTE cell 3 (S1850). The cell movement of the UE may be performed through cell reselection and/or handover.

The UE camps on the LTE cell 3 and may receive system information transmitted by the LTE cell 3. The UE may be aware that the LTE cell 3 is an MBMS cell providing an MBMS service through SIB3 of the system information received from the LTE cell 3. Furthermore, the UE may be aware that an MBSFN area related to an MBMS service provided by the LTE cell 3 is the MBSFN area3 through the SIB13. Since the MBSFN area3 is included in the MBSFN area list, the UE may determine that the logging of MBMS information is permitted.

The UE which has determined that the logging of MBMS information is permitted in the LTE cell 3 may periodically log MBMS information at the logging interval $T_1$ for the logging duration $T_D$. Accordingly, while the UE receives the MBMS service (S1865), the UE measures a reception signal related to the MBMS service and obtains and logs MBMS information (S1861, S1862). In order to obtain and log periodic MBMS information at the logging interval $T_1$, the UE may set and drive a timer. The timer may be set as the logging interval $T_1$, and the UE may execute the acquisition and logging of MBMS information whenever the timer expires.

In order to obtain and log the MBMS information, the UE may perform wireless measurements on a frequency and/or subframe in which the MBMS service is received at the logging interval $T_I$. The UE may include a measured result in the MBMS information. Furthermore, at a point of time at which the MBMS information is obtained and logged, the UE may include location information indicative of the location of the UE in the MBMS information. The MBMS information obtained and logged by the UE may be implemented like the logged MBMS information described with reference to FIG. 17. The MBMS information logged by the UE at each step may be logged as a single log entry.

When the logging duration $T_D$ is stopped, the UE may determine to stop the acquisition and logging of MBMS information (S1870).

The UE which has stopped the acquisition and logging of the MBMS information may report the logged MBMS information to the network. To this end, in order to notify the network that the logged MBMS information is present, the UE may send a logged MBMS information availability indicator to the network (S1881). The logged MBMS information availability indicator may be included in an RRC message and transmitted. The logged MBMS information availability indicator may be included in an RRC connection establishment-complete message, an RRC connection reconfiguration-complete message, an RRC connection re-establishment-complete message, or a UE information message and transmitted to the network. In this figure, the logged MBMS information availability indicator has been illustrated as being transmitted to the LTE cell, but the UE may send the logged MBMS information availability indicator to a corresponding serving cell if the UE uses another cell as a serving cell.

The LTE cell or another serving cell which has received the logged MBMS information availability indicator may send a logged MBMS information report request that requests the reporting of logged MBMS information to the UE (S1882). Thereafter, the UE may send the logged MBMS information to the LTE cell or another serving cell in response to the MBMS information report request (S1883).

In the example shown in FIG. 18, the logging scope configured in the UE may be specified as the MBSFN area. The UE has determined whether the logging of MBMS information is permitted based on an MBSFN area related to an MBMS service. If the logging of MBMS information is permitted, the UE has periodically executed the acquisition and logging of MBMS information within a specific duration interval based on the logging duration $T_D$ and the logging interval $T_1$. Unlike in the example of FIG. 18, UE may determine whether the logging of MBMS information is permitted based on the PLMN of an MBMS cell. Furthermore, UE may obtain MBMS information in response to a logging event and immediately report the logged MBMS information to a network. Such a method of reporting MBMS information is described with reference to FIG. 19.

Figure 19:
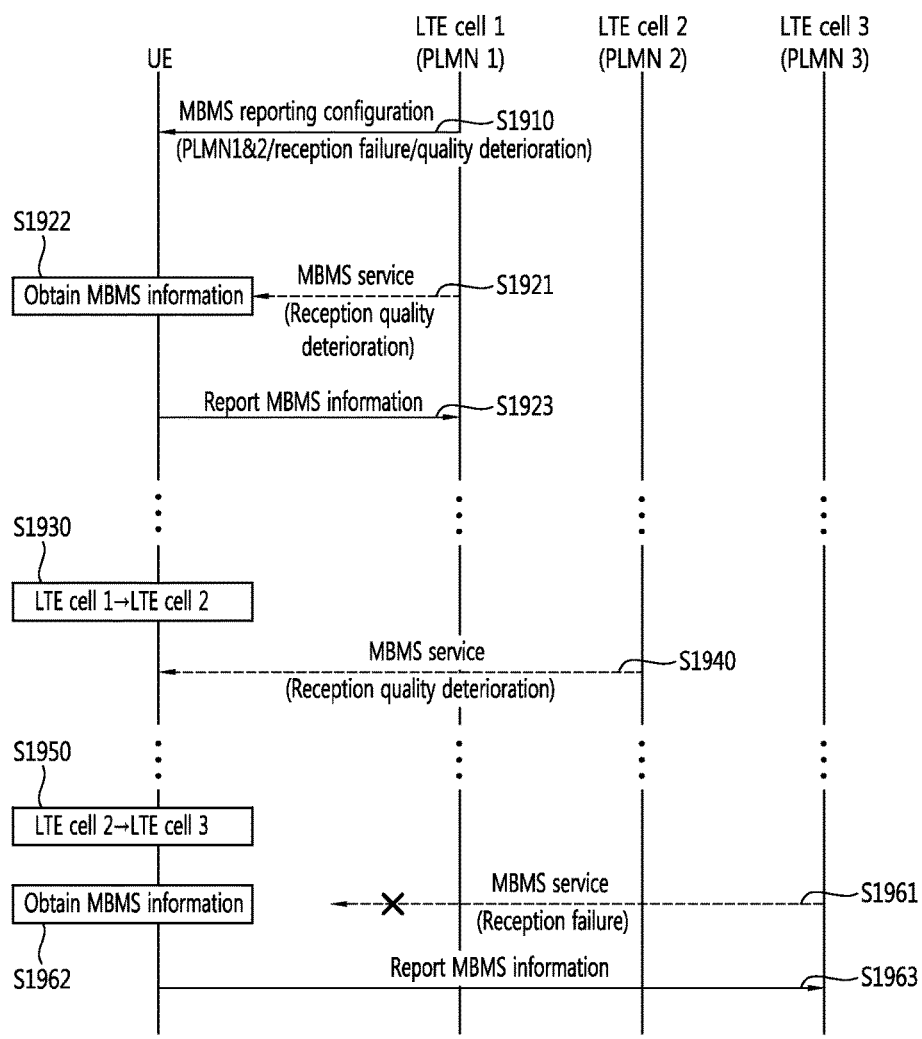
FIG. 19 is a diagram illustrating another example of a method for reporting MBMS information in accordance with an embodiment of the present invention.

FIG. 19 is a diagram illustrating another example of a method of reporting MBMS information in accordance with an embodiment of the present invention.

Referring to FIG. 19, UE receives an MBMS reporting configuration from an LTE cell 1 (S1910). The MBMS reporting configuration may be transmitted through dedicated signaling for the UE. In this case, the MBMS reporting configuration may be included in a specific RRC message and provided to the UE. Alternatively, the MBMS reporting configuration may be provided to the UE through broadcast signaling.

The MBMS reporting configuration may include a logging scope and a logging event as MBMS logging execution information. The logging scope may include a PLMN list including a PLMN in which logging is permitted. The PLMN list may include a PLMN1 and a PLMN3. The logging event may indicate an MBMS service failure and MBMS service deterioration.

The UE camps on the LTE cell 1 and may receive system information transmitted by the LTE cell 1. The UE may check that the corresponding cell is a cell based on the PLMN1 through the system information transmitted by the LTE cell 1. Accordingly, the UE may determine that the acquisition/logging of MBMS information are permitted while camping on the LTE cell 1.

The UE may perform the acquisition/logging of MBMS information based on a logging event. The UE receives an MBMS service from the LTE cell 1 and may determine whether or not to perform the acquisition/logging of MBMS information.

The UE has received the MBMS service, but may detect that MBMS service reception quality deterioration has occurred (S1921). Accordingly, the UE may determine the occurrence of a logging event and determine to obtain MBMS information. The UE measures the MBMS service and obtains MBMS information (S1922).

The UE may perform wireless measurements on a frequency and/or subframe in which the MBMS service is provided. The UE may include a measured result in the MBMS information. Furthermore, at a point of time at which the MBMS information is obtained, the UE may include location information indicative of the location of the UE in the MBMS information.

The MBMS information obtained at step S1922 has been triggered by a reporting event configured by an MBMS reporting configuration, and thus the UE may include information indicative of an MBMS information acquisition reason in the MBMS information. Acquisition reason information may be configured to indicate MBMS service reception quality deterioration. Additionally, if the UE is able to check a reason for MBMS service reception quality deterioration, MBMS service deterioration reason information may be included in the MBMS information. In addition, the obtained MBMS information may be implemented like the logged MBMS information described with reference to FIG. 17.

The UE reports the obtained MBMS information to the LTE cell 1 (S1923).

While in motion, the UE may move from the LTE cell 1 to an LTE cell 2 (S1930). The cell movement of the UE may be performed through cell reselection and/or handover.

The UE camps on the LTE cell 2 and may receive system information transmitted by the LTE cell 2. The UE may check that the corresponding cell is a cell based on a PLMN2 through the system information transmitted by the LTE cell 2. Accordingly, the UE may determine that the acquisition/logging of MBMS information is not permitted while camping on the LTE cell 2.

Although a logging event related to an MBMS service is generated while the UE receives the MBMS service from the LTE cell 2, the UE does not obtain MBMS information. The UE receives the MBMS service having low reception quality (S1940), but does not perform measurements on the MBMS service because the acquisition of MBMS information is not permitted.

While in motion, the UE may move from the LTE cell 2 to the LTE cell 3 (S1930). The cell movement of the UE may be performed through cell reselection and/or handover.

The UE camps on an LTE cell 3 and may receive system information transmitted by the LTE cell 3. The UE may check that the corresponding cell is a cell based on the PLMN3 through the system information transmitted by the LTE cell 3. Accordingly, the UE may determine that the logging of MBMS information is permitted while camping on the LTE cell 3.

The UE may perform the acquisition/logging of MBMS information based on a logging event. The UE receives an MBMS service from the LTE cell 3 and may determine whether or not to perform the acquisition/logging of MBMS information.

The UE may detect that the reception of the MBMS service from the LTE cell 3 has failed (S1961). Accordingly, the UE may determine the occurrence of a logging event and determine to log MBMS information. The UE measures the MBMS service and obtains MBMS information (S1962).

The UE may perform wireless measurements on a frequency and/or subframe in which the MBMS service is provided. The UE may include a measured result in the MBMS information. Furthermore, at a point of time at which the MBMS information is obtained, the UE may include location information indicative of the location of the UE in the MBMS information.

The MBMS information obtained at step S1962 has been triggered by a reporting event configured in an MBMS reporting configuration, and thus the UE may include information indicative of an MBMS information acquisition reason in the MBMS information. Acquisition reason information may be configured to indicate an MBMS service reception failure. Additionally, if the UE is able to check a reason for an MBMS service reception failure, a reason for the MBMS service reception failure may be included in the MBMS information. In addition, the obtained MBMS information may be implemented like the logged MBMS information described with reference to FIG. 17.

The UE reports the logged MBMS information to the LTE cell 3 (S1963).

In accordance with the method of reporting MBMS information according to an embodiment of the present invention, a network can set an MBMS information acquisition/logging scope for the report of MBMS information in UE so that the UE can log MBMS information and report the logged MBMS information only when the logging scope is satisfied. Accordingly, the measurements of an MBMS service and the reporting of MBMS information by UE can be controlled. This enables control of power consumed for the reporting of MBMS information by UE and enables control of signaling for the reporting of MBMS information. As a result, efficient power management and efficient management of radio resources for UE can be possible.

Figure 20:
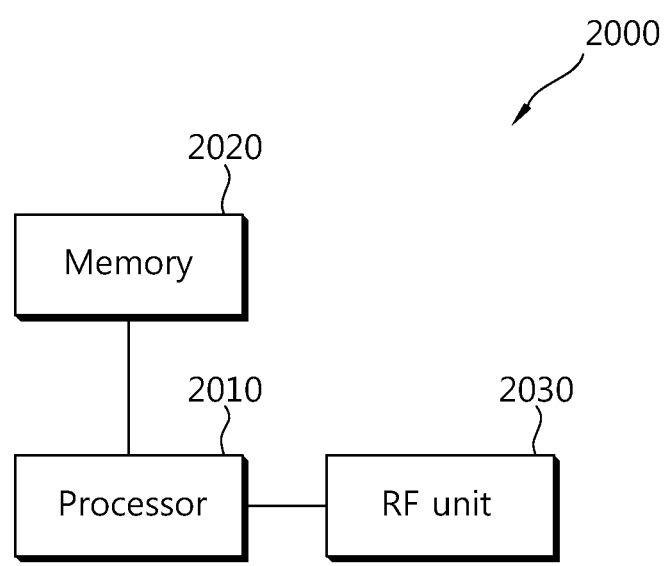
FIG. 20 is a block diagram illustrating a wireless device in which an embodiment of the present invention is implemented.

FIG. 20 is a block diagram showing a wireless device in which an embodiment of the present invention is implemented. The device may be implemented as UE or a network system for performing a cell reselection method in accordance with an embodiment of the present invention.

Referring to FIG. 20, the wireless device 2000 includes a processor 2010, memory 2020, and a Radio Frequency (RF) unit 2030. The processor 2010 implements the proposed functions, processes and/or methods. The processor 2010 may be configured to generate and provide an MBMS reporting configuration for the acquisition/logging and reporting of MBMS information. The processor 2010 may be configured to determine whether the logging of MBMS information is permitted based on a logging scope. The processor 2010 may be configured to obtain, log, and report MBMS information. The processor 2010 may be configured to perform the embodiments of the present invention described with reference to FIGS. 17 to 19.

The RF unit 2030 is connected to the processor 2010, and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include baseband circuits for processing radio signals. When the embodiment is implemented in software, the aforementioned scheme may be implemented as a module (process or function) that performs the aforementioned function. The module may be stored in the memory and executed by the processor. The memory may be placed inside or outside the processor and may be connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a multimedia broadcast and multicast service (MBMS) related measurement, performed by a user equipment (UE), in a wireless communication system, the method comprising:
   receiving logging configuration information from a network;
   performing logging of a MBMS related measurement according to the logging configuration information,
   wherein, if information related to MBMS single frequency network (MBSFN) areas is included in the logging configuration information, the UE performs the logging of the MBMS related measurement for MBSFN areas indicated by the information, and
   wherein the information is used to restrict at least one of the MBSFN areas for which the UE performs the logging of the MBMS related measurement;
   transmitting an availability indicator indicating an existence of logged MBMS information that is to be reported to the network;
   after transmitting the availability indicator, receiving a report request that requests the reporting of the logged MBMS information;
   after receiving the report request, transmitting the reporting of the logged MBMS information to the network,
   wherein the logged MBMS information includes the logged MBMS related measurement and a time stamp indicating a time related to the logging of the MBMS related measurement.

2. The method of claim 1, wherein a MBSFN list comprises a MBSFN area identity.

3. The method of claim 2, wherein the UE performs the MBMS related measurement for the MBSFN areas indicated by the MBSFN area identity.

4. The method of claim 1, wherein the logging of the MBMS related measurement is performed at regular time intervals.

5. The method of claim 1, wherein the time stamp is calculated as a current time minus absolute time stamp, and the time stamp is expressed in seconds.

6. The method of claim 1, wherein the logged MBMS information further includes location information indicating a location in which the UE has performed the logging of the MBMS related measurement.

7. The method of claim 1, wherein the logged MBMS information further contains log indices including a throughput of performance of the UE and an erroneous transmission/reception rate of the UE.

8. The method of claim 1, wherein the transmission of the availability indicator is performed after starting a conservation timer, which is set with a predetermined time value.

9. A user equipment (UE) for performing a multimedia broadcast and multicast service (MBMS) related measurement, the UE comprising:
   a radio frequency (RF) unit transmitting and receiving a radio signal; and
   a processor coupled to the RF unit,
   wherein the processor receives logging configuration information from a network and performs logging of a MBMS related measurement according to the logging configuration information,
   wherein, if information related to MBMS single frequency network (MBSFN) areas is included in the logging configuration information, the UE performs the logging of the MBMS related measurement for MBSFN areas indicated by the information,
   wherein the information is used to restrict at least one of the MBSFN areas for which the UE performs the logging of the MBMS related measurement,
   wherein the processor further transmits an availability indicator indicating an existence of logged MBMS information that is to be reported to the network, receives a report request that requests the reporting of the logged MBMS information, and transmits the reporting of the logged MBMS information to the network,
   wherein the logged MBMS information includes the logged MBMS related measurement and a time stamp indicating a time related to the logging of the MBMS related measurement.

10. The UE of claim 9, wherein a MBSFN list comprises a MBSFN area identity.

11. The UE of claim 10, wherein the UE performs the MBMS related measurement for the MBSFN areas indicated by the MBSFN area identity.

12. The UE of claim 9, wherein the logging of the MBMS related measurement is performed at regular time intervals.

13. The UE of claim 9, wherein the time stamp is calculated as a current time minus absolute time stamp, and the time stamp is expressed in seconds.

14. The UE of claim 9, wherein the logged MBMS information further includes location information indicating a location in which the UE has performed the logging of the MBMS related measurement.

15. The UE of claim 9, wherein the logged MBMS information further contains log indices including a throughput of performance of the UE and an erroneous transmission/reception rate of the UE.

16. The UE of claim 9, wherein the transmission of the availability indicator is performed after starting a conservation timer, which is set with a predetermined time value.

* * * * *